April 8, 1930.  J. B. NEWSOM  1,753,348
MONITORING SYSTEM
Filed May 4, 1928   11 Sheets-Sheet 1

INVENTOR
JAMES B. NEWSOM
BY
P. C. Smith
ATTORNEY

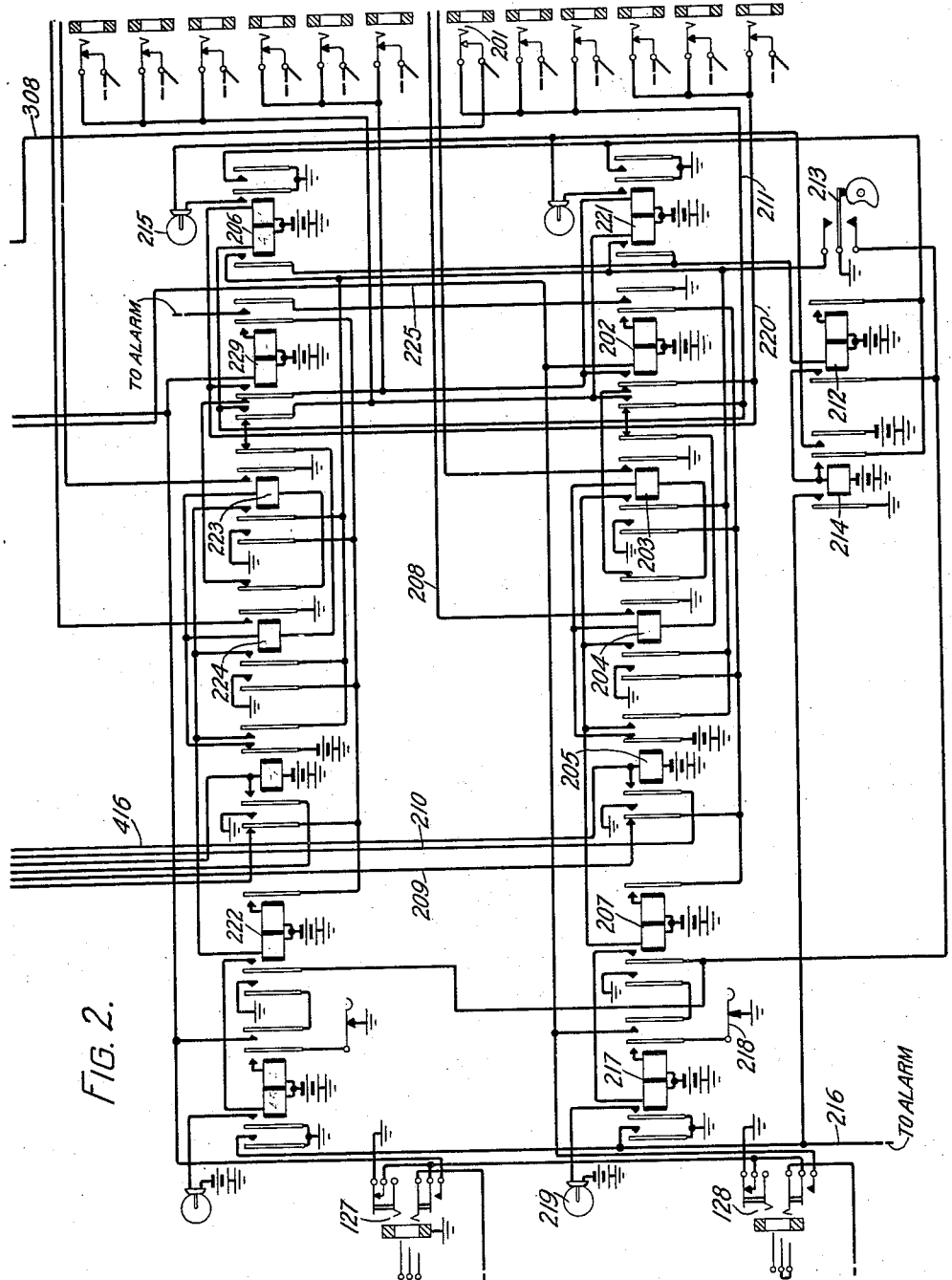

April 8, 1930.  J. B. NEWSOM  1,753,348
MONITORING SYSTEM
Filed May 4, 1928   11 Sheets-Sheet 4

INVENTOR
JAMES B. NEWSOM
BY P. C. Smith
ATTORNEY

April 8, 1930.

J. B. NEWSOM 1,753,348

MONITORING SYSTEM

Filed May 4, 1928 11 Sheets-Sheet 5

INVENTOR
JAMES B. NEWSOM
BY
P. C. Smith
ATTORNEY

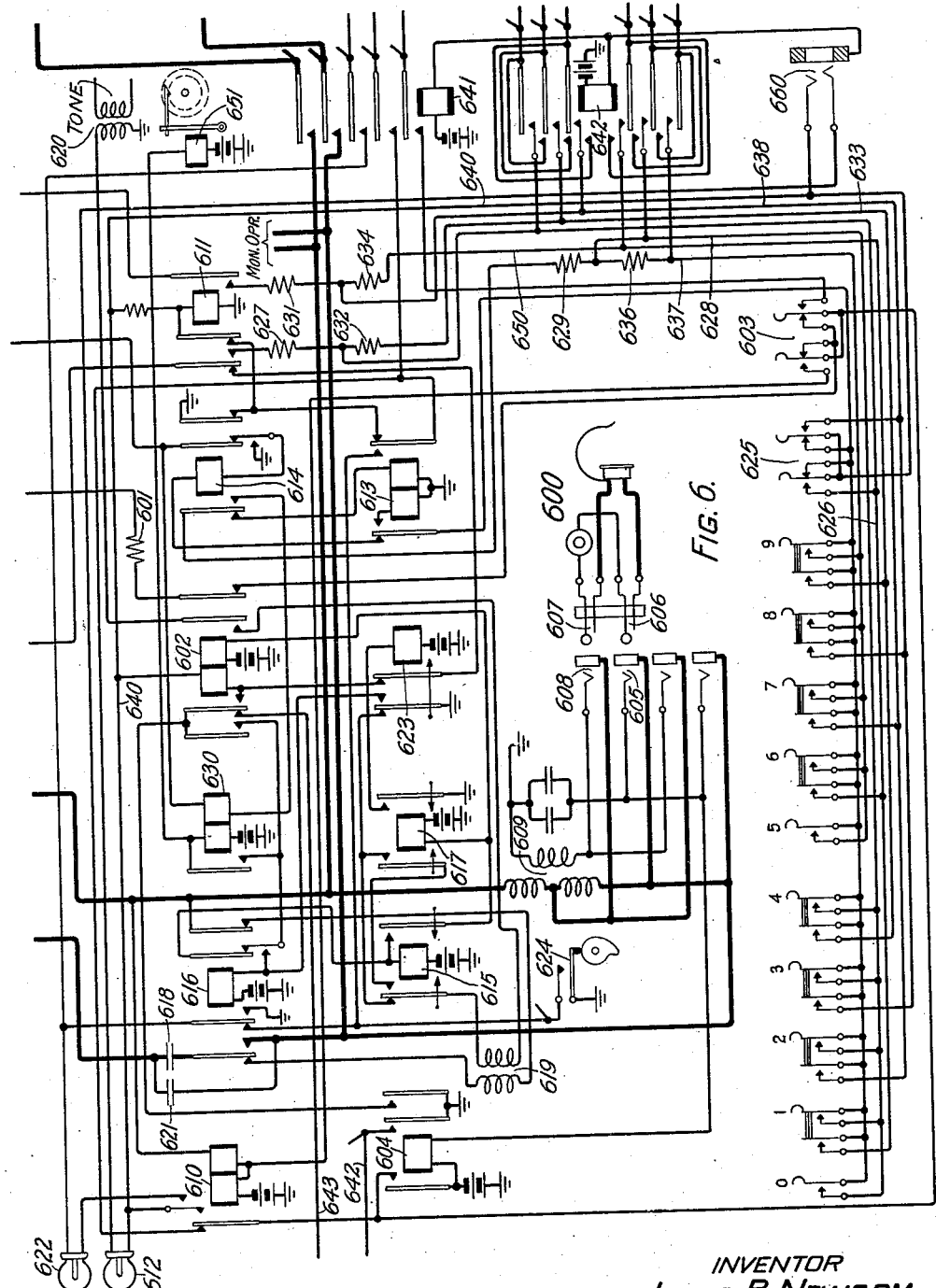

April 8, 1930.  J. B. NEWSOM  1,753,348
MONITORING SYSTEM
Filed May 4, 1928   11 Sheets-Sheet 7
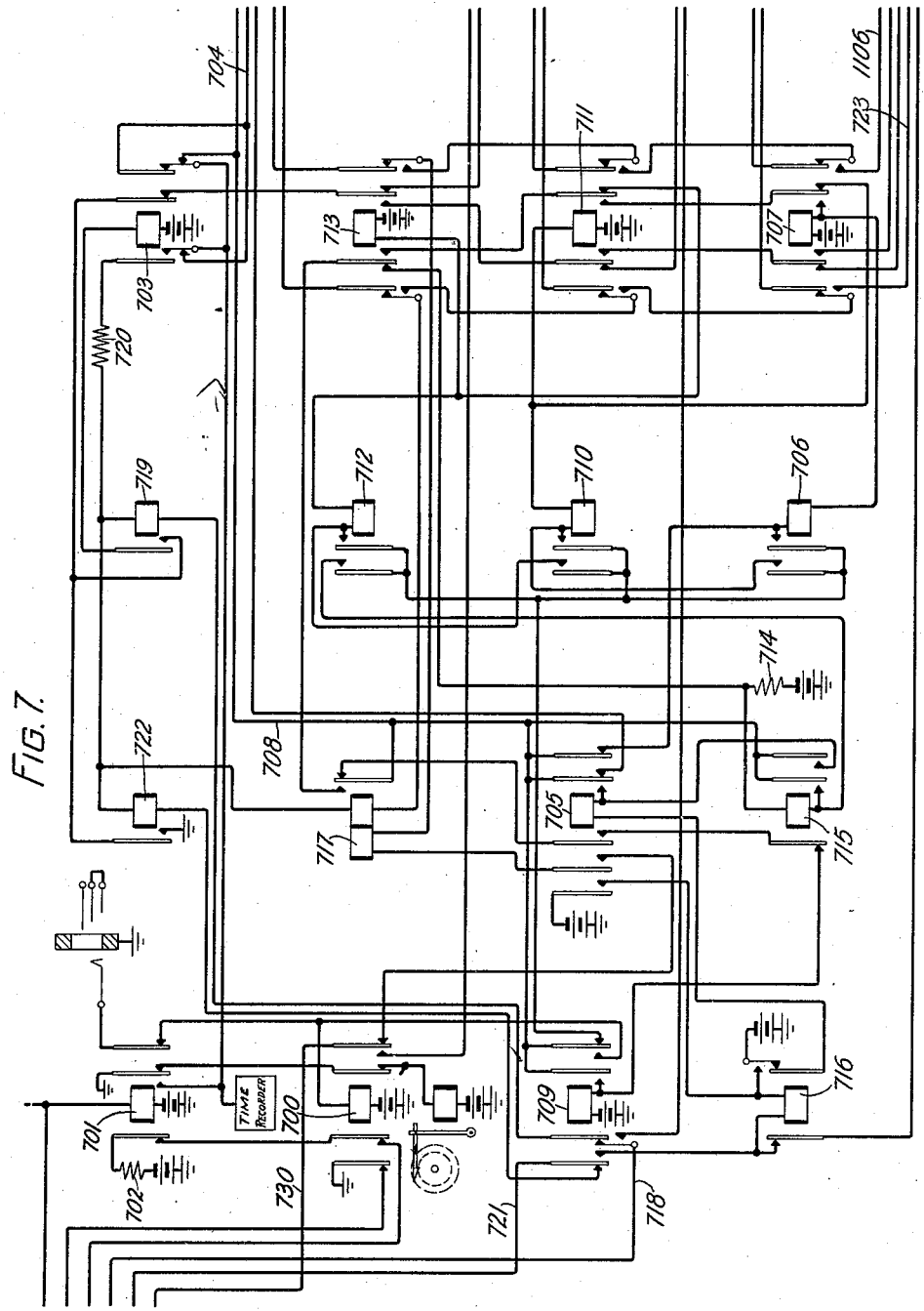
INVENTOR
JAMES B. NEWSOM
BY
P. C. Smith
ATTORNEY

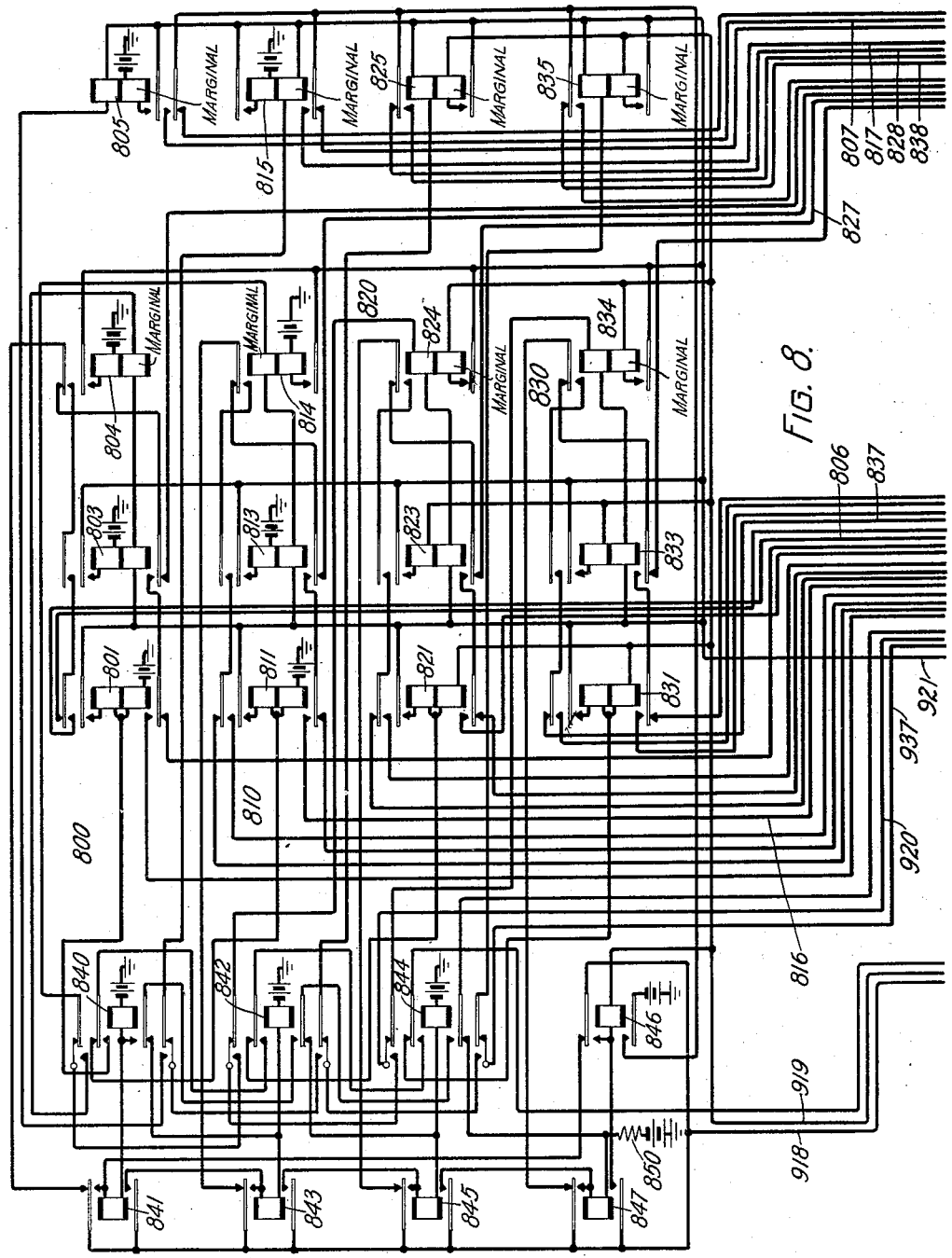

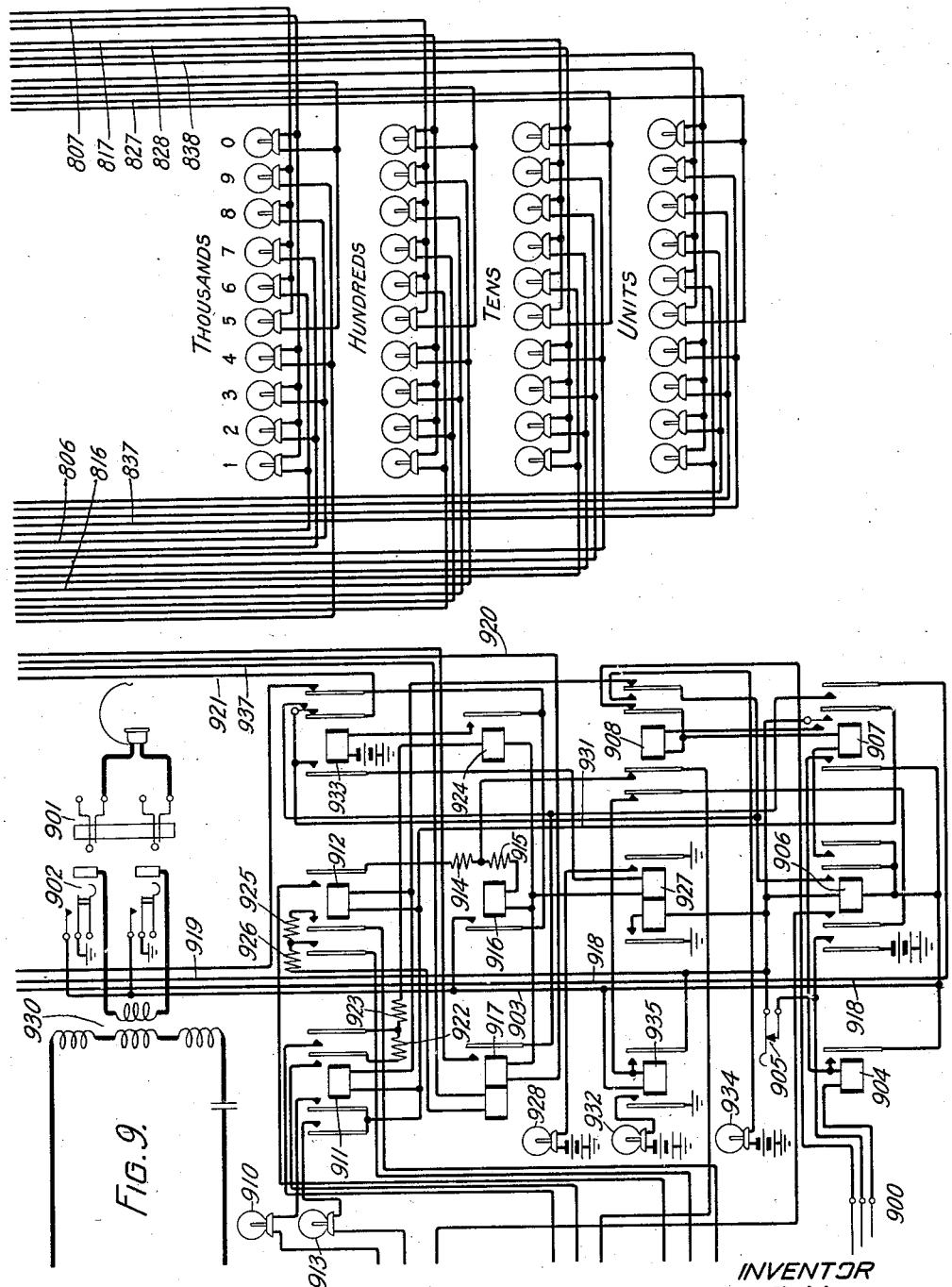

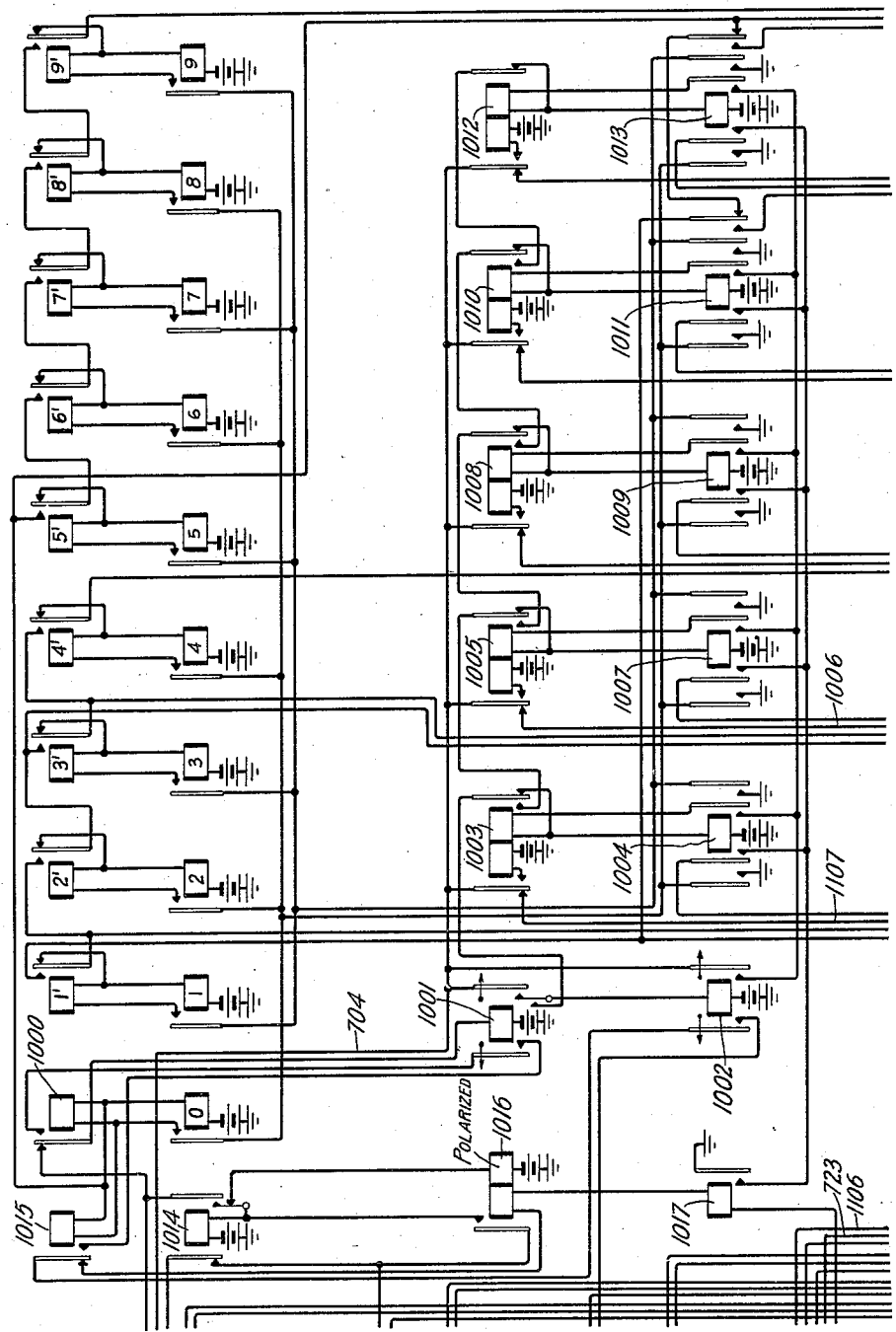

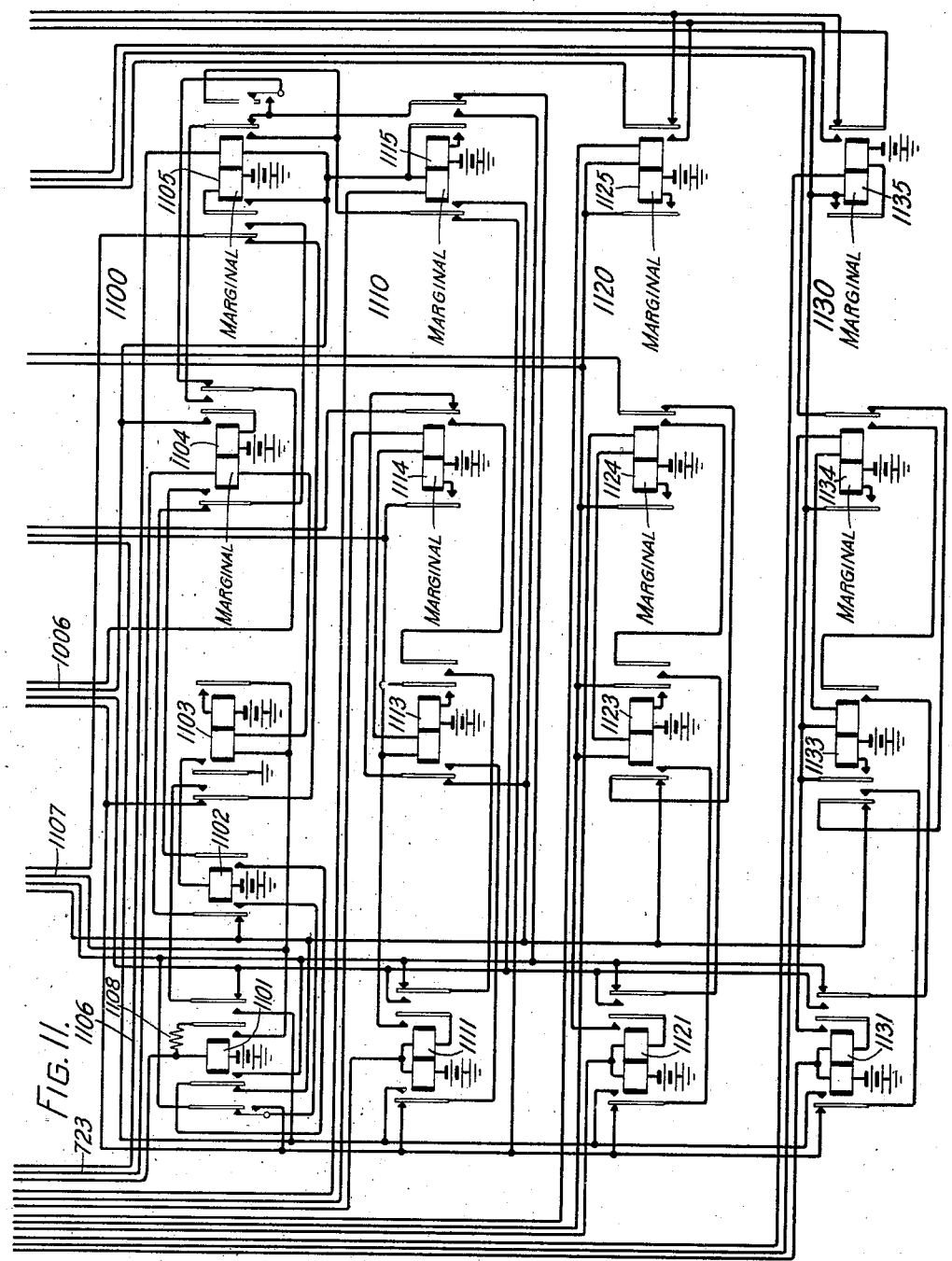

Patented Apr. 8, 1930

1,753,348

UNITED STATES PATENT OFFICE

JAMES B. NEWSOM, OF BROOKLYN, NEW YORK, ASSIGNOR TO BELL TELEPHONE LABORATORIES, INCORPORATED, OF NEW YORK, N. Y., A CORPORATION OF NEW YORK

MONITORING SYSTEM

Application filed May 4, 1928. Serial No. 274,994.

This invention relates to telephone systems and has for its object to provide means for checking the accuracy with which telephonic connections are established between manual and automatic offices with a view to reducing as much as possible wrong number complaints.

One method of establishing connections between a manual and a machine switching office is to provide operators at the machine switching office with special senders under key set control for controlling the setting of selector switches to connect with wanted lines. Wanted line designations may be communicated between the manual operator and the operator at the machine switching office by means of call circuits, the machine switching operator orally assigning a trunk to be used by the manual opeartor in extending the connection to the machine switching office; or the manual and machine switching operators may be connected together over the trunk circuit extending between the offices which are to be employed in the desired subscriber to subscriber connection.

In accordance with the present invention means has been provided for observing the service which operators at machine switching positions of the type above referred to are rendering, including means for listening in on the order given to a machine switching operator and for giving a visual indication of the numbers set up on the operator's key set. Means is provided for associating the observing equipment with any desired operator's position. When a number has been set up, the observing equipment is automatically rendered unresponsive to the position equipment and the observing operator is provided with means for again rendering the observing equipment responsive to the position equipment.

In particular the regular registering equipment of the operator's sender is not affected in any manner by the association of the observing equipment with the operator's key set since direct battery is used on the active contact of each key and the monitoring paths extend in parallel with the registering paths and are of the same resistance.

The registering arrangement of the key monitoring circuit is provided with a plurality of registers and a plurality of transfer relays. The extension of a call to the observed position, following the association of the monitoring circuits with the operator's position causes the operation of all of the transfer relays in pairs and the registration of each digit deenergizes a pair of said relays in the same order as they were energized to transfer the registration conductors from register to register.

These and other features of the invention will be more clearly understood from a consideration of the following description in connection with the drawings in which Fig. 1 shows portions of a number of link circuits, Fig. 2 shows the start circuit for initiating the operation of a link circuit, Fig. 3 shows an incoming selector circuit suitable for controlling final selections in selecting a line without testing it, Figs. 4 and 5 show a complete link circuit, Fig. 6 shows an operator's position, Figs. 7, 10 and 11 show an operator's sender, Figs. 8 and 9 show a monitoring operator's position, and Fig. 12 shows the manner in which Figs. 1 to 11 should be arranged.

In general the system disclosed operates as follows: A subscriber originating a call is aswered by an operator known as an A operator who, after receiving the called line number, calls upon an outgoing or B operator for assistance. She does this by inserting the calling plug of her cord circuit in a jack individual to a trunk which terminates in an incoming selector controlled by the B operator's equipment. In the present disclosure the incoming selector is one which controls a final selector in establishing a "no test" connection but the operation in relation to the link circuit and sender does not differ materially from that of an incoming selector used in establishing a service connection. The insertion of the plug in the jack completes a start circuit which causes the trunk finder of a link circuit to hunt for the incoming selector associated with the jack. As soon as the trunk finder has been started the position finder is operated to select an idle B operator's position. When both have been found two tones called "zip tones" are transmitted from the B position to the A position and the A operator's cord circuit is connected with the B operator's headset so that she may inform the B operator of the wanted number. As soon as the idle position is found the sender finder of the link circuit is actuated to find an idle sender. When this has been found the B operator is signaled and she operates the keys of her key set in accordance with the wanted number. The number is recorded in the sender after which the position is disconnected from the link and the sender is connected with the incoming selector to control the setting of that selector and through it the setting of the final selector. When the selectors have been positioned the link circuit is disconnected and the established circuit is placed under the control of the A operator.

In order to insure quickness and continuity of service, distribution of wear, etc., the trunks terminating in the incoming selectors and in the link circuits have been arranged in groups. The trunks appear before the trunk finders of the link circuits in the bank of a panel type switch frame. The bank is divided once horizontally into two panels and each panel is divided vertically into two sections so that the terminals in the upper half of one section may be cross-connected to the terminals of the lower half of the other section. The trunks appearing in the bottom half of one section are known as the A group of trunks and those appearing in the bottom half of the other section as the B group of trunks. Each link circuit is represented at the switch frame by a set of brushes. The links terminating in brushes having access to the section of the panel bank in which the A trunks appear at the bottom are called the A group of links and those terminating in brushes having access to the other section are called the B group. Each brush rod carries two sets of brushes, one for each panel. The brush rods are arranged on both sides of the panel and the rods on the two sides are driven by different motors. A call on a trunk in the A group will ordinarily initiate the operation of an A link and a call on a trunk in the B group the operation of a B link. However, the start circuit is so arranged that if all A links becomes busy and a call is initiated on an A trunk a B link may be used and vice versa. Likewise if the trunk finder of the A link fails to find the trunk a B link will be summoned. If the motor which drives the brush rods on one side of the panel stops, the link circuits on that side are rendered non-usable and the link circuits on the other side continue the operation.

*Detailed description*

Figure 3:
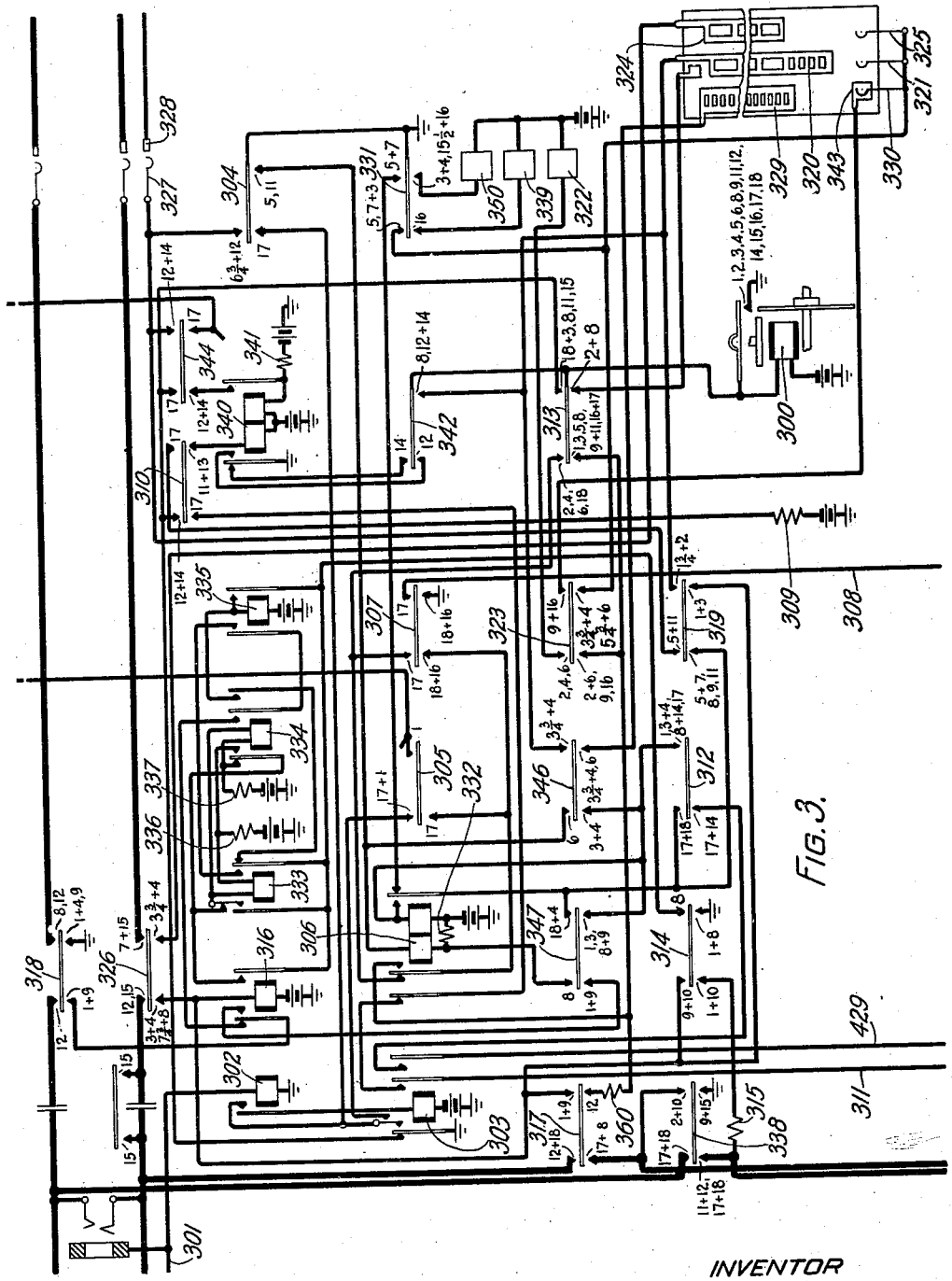

A detailed description of the operation of the circuits will now be given. When an A operator plugs into the jack at her position she connects battery to conductor 301 completing a circuit thereover through the winding of relay 302 to ground. Relay 302 operates, closing a circuit from battery through the winding of relay 303, front contact of relay 302, lower left contact of cam 304 to ground. It should be noted that the incoming selector sequence switch 300 stands in position 17 when not in use. Relay 303 locks under the control of relay 302 to ground at its own outer left contact. The operation of relay 303 indicates to the start circuits that a call has been originated, that is, relay 303 closes a start circuit extending from ground at its inner left front contact, left contacts of cam 305, inner left back contact of relay 306, upper contacts of cam 307, conductor 308 to the contact of jack 201. Jack 201 is individual to the group of ten trunks to which the trunk of Fig. 3 belongs. From jack 201 the start circuit extends to conductor 211, which is common to the 30 trunks of the sub-group B of the top panel in which the trunk appears, and thence by three circuits to battery. One circuit extends through the left winding of relay 206 to battery; a second circuit extends over the outer left back contact of relay 202, right back contact of relay 203, winding of relay 204, and the right back contact of relay 205 to battery, while a third extends from the winding of relay 204, through the winding of relay 203, right back contact of relay 204, inner left back contact of relay 202, to the right winding of relay 206.

Relay 204, which is individual to the B group of trunks in the top panel, and relay 206, which is common to the B groups of both panels, operate in these circuits but relay 203 does not, being shunted by the battery at the back contact of relay 205. Relay 204 in operating connects ground over its outer left front contact and the left back contact of relay 205 to conductor 209, for starting a link circuit in search of the waiting incoming trunk. It also connects ground to conductor 208 to operate tripping magnets 510 and 511 in preparation for tripping the top set of brushes which belong to the selector finder of the B link allotted to serve the present call. The operation of these magnets as is well known operates all of the trip fingers of the group, but only the brushes on the brush rod moved will be tripped. Relay 204 also opens the circuit of relay 203.

Relay 206 in operating starts a timing operation for the purpose of transferring the call to the other sub-group of links if it is not extended within a predetermined length of time, and for operating an alarm signal if the call cannot be handled. The operation of this alarm arrangement will be described hereinafter.

Figure 4:
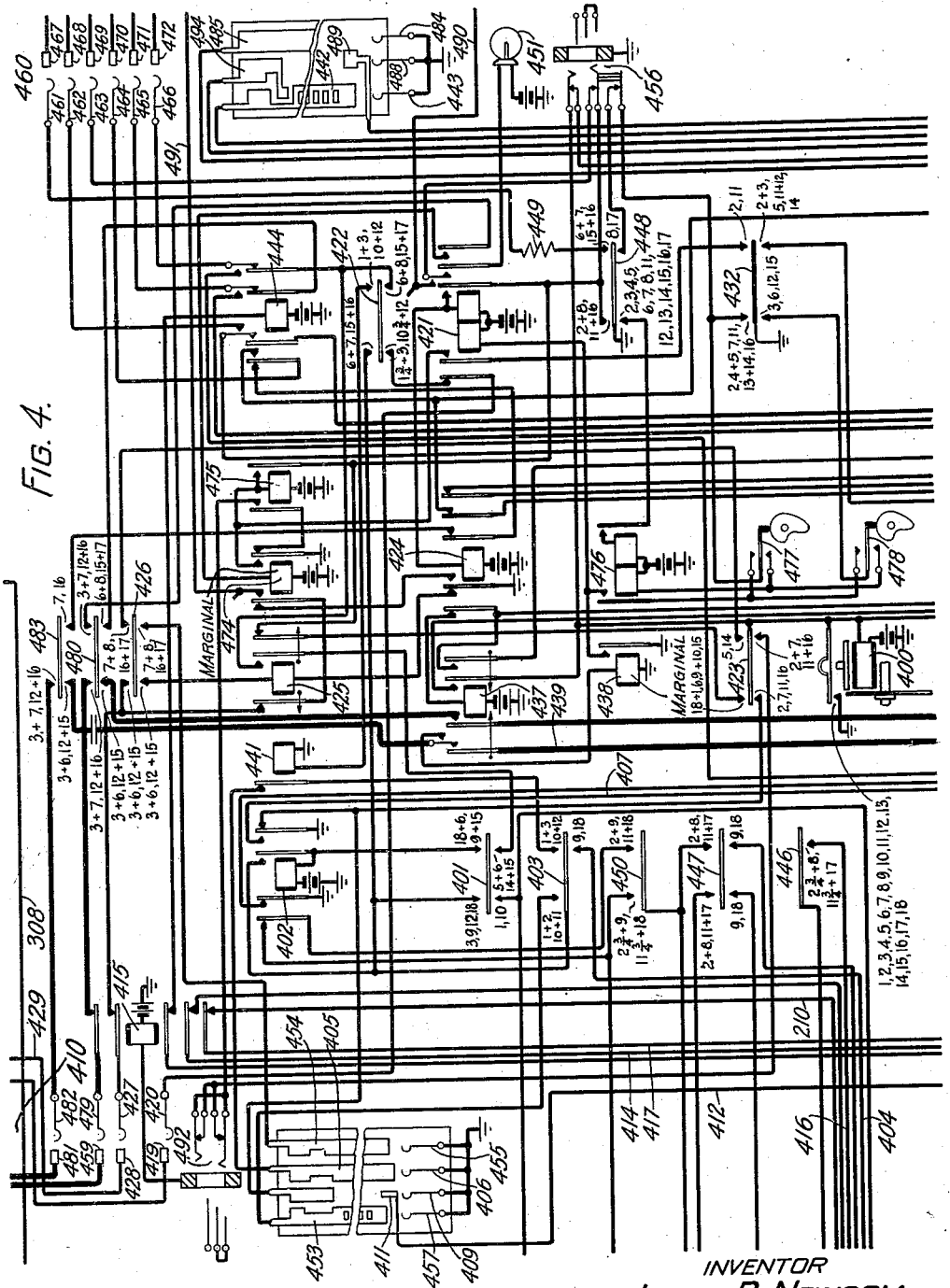

The sequence switches of busy links stand in any position from 2 to 8 or 11 to 17 inclusive. If the link circuit is waiting assignment the sequence switch stands in positions 9 or 18 while the sequence switch of the link circuit assigned for use stands in position 1 or position 10. Assuming that the link shown in Fig. 4 is the next one to be used and therefore has its sequence switch standing in position 1, the circuit traced as above described to conductor 209 may be further traced over the inner left back contact of relay 101, lower left and upper right contacts of cam 401, winding of relay 402 to battery. Relay 402 operates preparing a locking circuit for itself over its inner right front contact, upper right contact of cam 403, back contact of relay 441, commutator strip 405, brush 406 to ground. Relay 402 also closes a circuit from ground at its outer right front contact, conductor 407, left contacts of cam 408, winding of sequence switch magnet 400 to battery. Sequence switch 400 advances to position 2 in this circuit. With sequence switch 400 in position 2 the ground connected to conductor 407 by relay 402 is extended over the lower contacts of cam 408 to the winding of updrive magnet 430 and battery. Magnet 430 is the updrive magnet for the selector finder 410, the brushes of which are shown at the upper left corner of Fig. 4.

Figure 5:
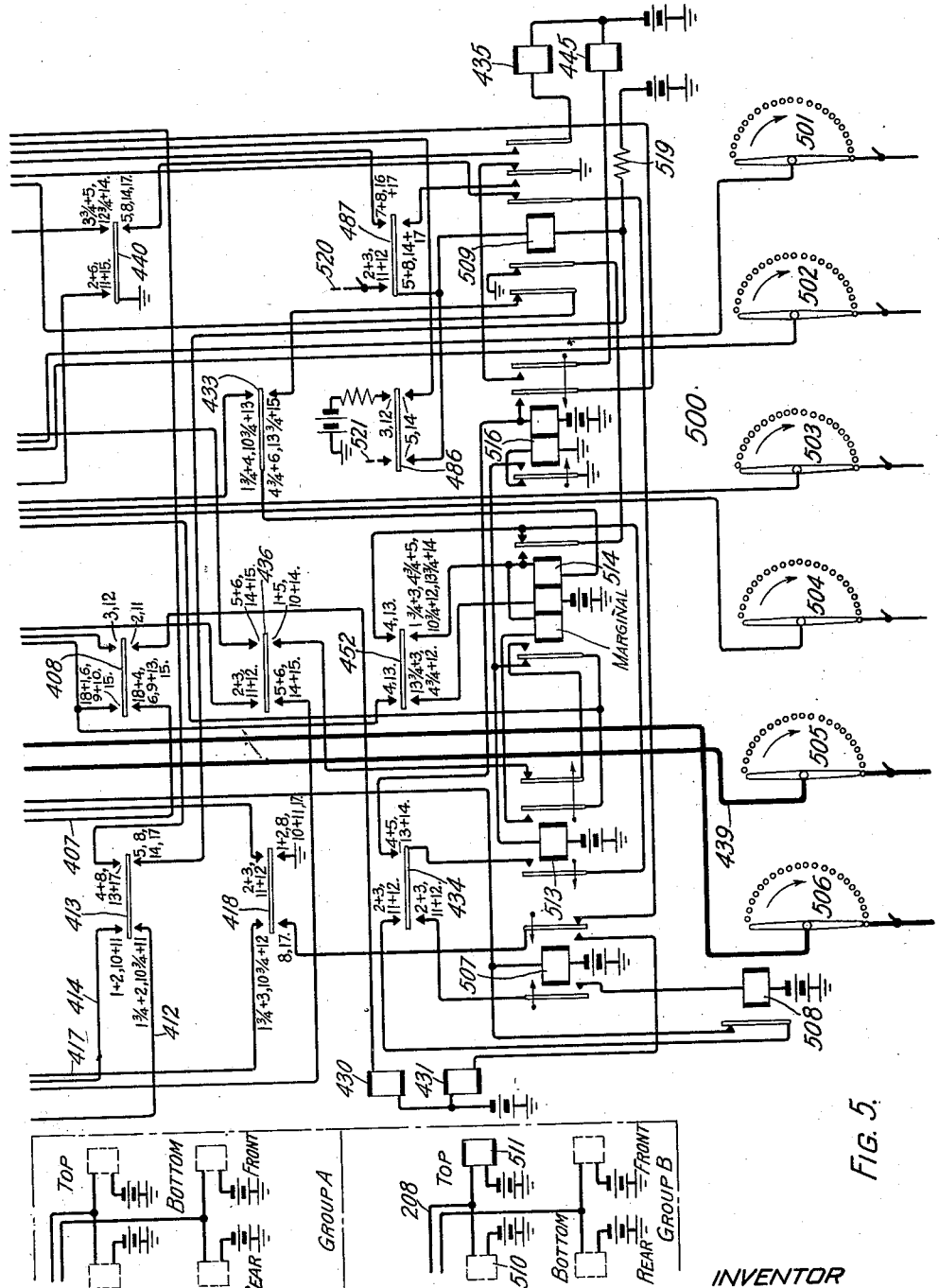

It should be noted at this point that the sequence switch cams in both Figs. 4 and 5 are controlled by magnet 400 and have therefore been given numbers in the fourth hundred as well as the up and down drive magnets of both the selector finder and the sender finder. Sequence switch 400 in controlling a complete cycle of operations of the link circuit is moved through only half a revolution, the second half revolution controlling a second cycle.

As finder 410 is moved upward, magnet 511 trips the brush set. Immediately after starting upward commutator brush 409 makes contact with segment 411 completing a circuit from ground over brush 409, segment 411, conductor 412, left contacts of cam 413, conductor 414, middle lower contact of relay 415, conductor 416, winding of relay 205 to battery. Relay 205 operates and locks over its inner left front contact, conductor 210, lowermost back contact of relay 415, conductor 417, upper left and lower right contacts of cam 418 to ground. Relay 205 in operating opens the operating circuit of relay 402 but that relay does not release since its locking circuit is now closed over commutator segment 405. Relay 205 closes a substitute locking ground for relay 207 and opens the circuit of relay 204 permitting that relay to release in turn releasing the tripping magnets 510 and 511.

The incoming selector marks itself as calling by connecting battery through resistance 309, upper right and lower left contacts of cam 310, outer left back contact of relay 306, inner right front contact of relay 303, over conductor 311 to terminal 419. When the selector finder 410 reaches the set of terminals corresponding to this incoming selector, the circuit is further extended over brush 420, left back contact of relay 421, lower left and upper right contacts of cam 422, winding of relay 441 to ground. Relay 441 operates in this circuit opening the locking circuit of relay 402. Relay 402 does not release until the brushes are properly centered, being held operated by means of a circuit from battery, through the winding and inner right front contact of relay 402, upper left contact of cam 403, commutator 453, brush 457 to ground. The release of relay 402 opens the circuit of updrive magnet 430 bringing the finder to rest on the terminals leading to the incoming selector.

With relay 402 released it completes a circuit from ground over the left contacts of cams 116 and 115, outer right back contact of relay 101, left contact of cam 114, outer left back contact of relay 402, right contact of cam 450, upper contacts of cam 447, lower contact of cam 117 of the next link to conductor 118, leading to the winding of the relay corresponding to relay 402 of the next link. While only four links have been shown it will, of course, be understood that as many links will be used as the traffic requires and that the sequential relationship extends throughout. The release of relay 402 also closes a circuit from battery through the winding of sequence switch magnet 400, lower left contact of cam 423, to ground at the right back contact of relay 402, advancing sequence switch 400 to position 3.

When sequence switch 400 leaves position 2 the locking circuit of relay 205 is opened and that relay releases restoring the start circuit so that another incoming selector appearing in this same section of the terminal bank of the link finders may receive attention.

When sequence switch 400 arrives in position 3. a circuit is closed from ground at the inner left back contact of relay 424, winding of relay 425, left contacts of cam 426, inner upper contact of relay 415, brush 427, terminal 428, conductor 429, outer right contact of relay 303, lower left and upper right contacts of cam 312, right winding of relay 306 to battery. Relays 425 and 306 operate in this circuit, relay 306 opening the previously traced circuit for relay 441. Relay 306 in operating also closes a circuit from battery through the winding of sequence switch magnet 300, lower left contact of cam 313, left front contact of relay 306, left contacts of cam 305 to ground at the inner left contact of relay 303. Sequence switch 300 advances in this circuit to position 18. The operation of relay 306 and the advance of sequence switch 300 removes the calling condition from conductor 308, releasing relay 206.

Relay 306 remains locked in position 18 over a circuit extending from battery through its right winding, right front contact, left contacts of cam 312, outer right contact of relay 303, conductor 429, and thence as previously traced to ground. The release of relay 441 permits relay 402 to reoperate in a circuit from battery through the winding of relay 402, upper contacts of cam 401, upper right contact of cam 403, back contact of relay 441, commutator strip 405, brush 406, to ground.

While sequence switch 400 was in position 2, a circuit was completed from battery through the winding of relay 513, left back contact of relay 514, lower right contact of cam 432 to ground, which circuit remains closed in position 3. Relay 513 in operating completes one circuit for relay 514 and prepares another. The first circuit extends from ground at the lower right contact of cam 432, right front contact of relay 513, left winding of relay 514, lower contacts of cam 452, middle winding of relay 514 to battery. The other circuit extends as previously traced through the left winding of relay 514 and thence through the right winding of relay 514, upper contact of cam 433, outer right contact of relay 424, to brush 503 of the position finder switch 500. Relay 514 is marginally adjusted so that the circuit completed through its left and middle windings does not operate it but renders it quick to operate when the circuit is completed over brush 503. Assuming that the position engaged by finder 500 is either vacant or busy, this circuit is not completed and relay 514 does not operate so that relay 513 in operating also closes a circuit for relay 507 extending over the back contact of stepping magnet 508, upper left contact of cam 434, left front contact of relay 513, right back contact of relay 514, to ground at the inner left contact of relay 509. Relay 507 operates in this circuit in turn closing a circuit for magnet 508 extending from battery through the magnet winding, left front contact of relay 507, lower contact of cam 434, and thence as previously traced to ground at the contact of relay 509. Magnet 508 in operating opens the circuit of relay 507, which releases in turn releasing magnet 508 to step the position finder 500 to the next position.

When an operator is present at a position she inserts her telephone plugs 606 and 607 in the position jacks 605 and 608 completing a circuit from battery, through the winding of relay 604, tips of jack 605 and plug 606, through the transmitter of headset 600, tips of plug 607 and jack 608, winding of repeating coil 609 to ground. Relay 604 in operating connects battery over its left front contact, contact of key 603, right back contact of relay 602, resistance 601, having a value of 270 ohms, to the corresponding terminal of brush 503. It also connects ground over its inner right contact to conductor 642 to disable the night alarm and over its outer right contact, left back contact of relay 602 to conductor 643 to disable the operator's busy alarm. Therefore when the position is vacant it will be characterized at brush 503 by absence of either battery or ground on the terminal.

When a position is busy, relay 602 is operated as will be described hereinafter and ground is disconnected from conductor 643. If all positions are busy this permits a relay in the busy alarm circuit to release, closing a circuit from ground to conductor 520 of the link circuit, left contact of cam 487, through the winding of relay 509, resistance 519 to battery. The operation of relay 509 opens the above traced circuits for testing the positions and for operating the position finder. If all positions are vacant, as might be possible at night, ground is disconnected from both conductors 643 and 642 so that the position finder is prevented from operating and in addition an alarm is sounded under the control of conductor 520. When the operator in attendance inserts her plug at a position she operates the corresponding relay 604, permits the extension of the call to that position, and silences the night alarm.

Assuming that the next position is idle, a circuit will be completed from ground as above traced to brush 503, resistance 601, right back contact of relay 602, contacts of key 603, to battery at the left front contact of relay 604. Relay 514 operates and locks in a circuit from battery through its middle winding and lower contacts of cam 452, in parallel with battery over brush 503, outer right back contact of relay 524, upper contact of cam 433 and right winding of relay 514, to ground over the right front contact of relay 514 and the inner left contact of relay 509. The connection of ground through the 30 ohm low resistance right winding of relay 514 to the contact of brush 503 marks the position busy to other link circuits. If two relays such as relay 514 test a position simultaneously both relays may operate but the attempted closure of a locking circuit by these relays has a shunting effect on each other so that both relays release and then the faster relay reoperates and prevents the operation of the other relay and appropriates the position.

While the position finder is operating with sequence switch 400 in position 3 battery is connected over the upper contacts of cam 486 to conductor 521 to operate a calls waiting alarm if more than a predetermined number of link circuits have been selected and have not yet been connected with an operator's position.

The operation of relay 514 opens the circuit of relay 513 and that relay releases. A circuit is thereupon closed from ground at the lower right contact of cam 432, left front contact of relay 514, right back contact of relay 513, lower right and upper left contacts of cam 436, outer left back contact of relay 424, winding of relay 437 to battery. Relay 437 operates extending the talking conductors to the operator's position. Relay 437 also closes a circuit from battery through the winding of magnet 400, inner right front contact of relay 437, upper right and lower left contacts of cam 408, conductor 407 to ground at the outer right contact of relay 402.

Sequence switch 400 advances to position 4 in this circuit, releasing relay 402. Relay 437 in operating completes a circuit from ground through the winding of relay 438, middle left contact of relay 437, over the tip conductor 439, brush 505, windings of relay 610 to battery. Relay 610 operates in this circuit but relay 438 is marginal and does not. Relay 610 in operating closes a circuit from battery over the front contact of relay 604, outer left contact of relay 610, white lamp 612, right back contact of relay 613, to ground at the right back contact of relay 614 indicating that the sender has not yet been attached. It also closes a circuit in parallel therewith over the inner left contact of relay 610, green lamp 622, inner left back contact of relay 616, interrupter 624 to ground causing lamp 622 to flash to indicate that a call is incoming to this position. A circuit is also closed in parallel with lamp 612, through the left winding of relay 602, inner back contact of relay 623, outer left back contact of relay 611, brush 504, middle right contact of relay 424, upper right contact of cam 440 to ground. Relay 602 operates and locks over its inner left front contact to ground at the outer right front contact of relay 604. Relay 602 in operating disconnects battery from brush 503, opening the circuit of relay 514, which relay releases.

The tip and ring conductors connecting the position with the trunk are connected together at the position through condenser 618, outer left back contact of relay 616, secondary winding of repeating coil 619 and the outer right contact of relay 616. Relay 602 in operating completes the primary circuit of coil 619 from ground at the outer left contact of relay 623, left back contact of relay 615, primary winding of coil 619, right front contact of relay 602, to source of tone 620. The headset 600 is also connected across the tip and ring conductors in a circuit extending from the tip conductor through the condenser 621, sleeves of jack 605 and plug 606, receiver of headset 600, sleeves of plug 607 and jack 608 through a portion of coil 609 to the ring conductor. The B operator therefore hears the tone which is transmitted out over the tip and ring conductors to the A operator's headset. Relay 602 in operating also closes a circuit from battery through the winding of relay 615, inner right contact of relay 616, outer left front contact of relay 602 to ground at the outer right contact of relay 604. Relay 615 is slow to operate thus permitting the connection of the tone to the trunk for a definite interval before the operation of that relay opens the primary circuit. Relay 615 extends its operating ground to the right winding of relay 602 and the winding of relay 617. Relay 617 is also slow to operate causing a definite silent interval before the operation of that relay again completes the primary circuit over the front contacts of relays 615 and 617. Relay 617 in operating closes a circuit for relay 623 which is also slow to operate. When the relay 623 operates, it removes ground from the primary circuit. Relay 623 also opens the operating circuit of relay 602 but relay 602 remains operated in its locking circuit above traced. Relay 623 also closes a circuit from ground at its front contact, winding of relay 616 to battery. Relay 616 locks over its inner right front contact, outer left front contact of relay 602 to ground at the outer right contact of relay 604. Relay 616 in operating trasnfers the circuit of green lamp 622 from interrupter 624 to solid ground at its inner left front contact to indicate that the circuit is ready for the call to be passed. Relay 616 also connects the tip and ring conductors from the trunk to the operator's repeating coil 609. In addition relay 616 opens the circuit of relays 615 and 617, and the circuit through the right winding of relay 602, and disconnects the tone coil 619 from the trunk conductors. The zip tones having been terminated, the A operator at the distant board passes the call to the B operator.

The release of relay 514 after the position has been found and connected with the incoming trunk closes a circuit from battery through the winding of sequence switch magnet 400, upper contacts of cam 452, right back contact of relay 514, to ground at the inner left contact of relay 509. Sequence switch 400 is advanced to position 5 in this circuit. A circuit is now closed from battery through the winding of relay 513, left back contact of relay 514, to ground at the lower right contact of cam 432. Relay 513 in operating closes a circuit from battery through the right winding of relay 516, right contact of cam 434, left contact of relay 513, right back contact of relay 514, to ground at the inner left contact of relay 509. Relay 516 operates and prepares a holding circuit for itself over its inner right contact, commutator strip 442, and brush 443 to ground. The sender finder to which this commutator belongs normally stands in engagement with some sender which may be free or idle and therefore brush 443 will be in engagement with an insulating segment on strip 442. Relay 513 completes the same circuit as it formerly completed for relay 514. It also prepares a circuit for that relay extending from ground on the lower right contact of cam 432, inner right contact of relay 513, left winding of relay 514, right winding of relay 514, lower contact of cam 433, outer left contact of relay 509, to brush 463 of sender finder 460. Assuming that the sender on which finder 460 rests is not idle, a circuit is closed from battery through the winding of updrive magnet 445, outer right contact of relay 516, outer right back contact of relay 509 to ground. The sender finder is moved upward under the control of magnet 445 until brush 463 engages the terminal corresponding to an idle sender which is characterized by battery through a resistance of 270 ohms.

If the sender selector 460 does not find an idle sender in its upward movement, when it reaches the top of its bank, commutator brush 488 will engage segment 494, closing a circuit from ground, over the brush and segment, lower contacts of cam 486, winding of relay 509, resistance 519 and battery. Relay 509 operates, opening the circuit of updrive magnet 445, opening the test circuit through relay 514, opening the circuit of relay 516, and locking over its inner right front contact and the lower contact of cam 487 to ground. It closes a circuit from battery through the winding of downdrive magnet 435, outer front contact of relay 509 to ground at the lower contact of cam 440. The sender finder is therefore restored to normal, at which time a circuit is closed from ground over brush 488, normal segment 489, right contacts of cam 413, resistance 519 in shunt of the winding of relay 509, releasing that relay. The release of relay 509 opens the circuit of downdrive magnet 435, restores the circuit of relay 516, the test circuit through relay 514, and the circuit of updrive magnet 445 so that the sender finder may seek further for an idle sender.

When an idle sender is found the circuit of relay 514 is extended over terminal 469, inner left back contact of relay 700, left contact of relay 701, resistance 702 to battery. Relay 514 operates immediately opening the operating circuit of relay 516, and that relay releases as soon as its holding circuit is opened at commutator strip 442 to open the circuit of updrive magnet 445 to bring the brushes of finder 460 to rest on the terminals leading to the idle sender. Relay 514 also opens the circuit of relay 513 and that relay releases. When relay 513 closes its back contact a circuit is completed from ground at the lower right contact of cam 432, left front contact of relay 514, right back contact of relay 513, lower contacts of cam 436, inner lower contact of relay 415, winding of relay 444 to battery. Relay 444 operates and locks in a circuit which may be traced as before to the lower left contact of cam 436, upper right contact of cam 436, left contacts of relay 444, brush 462, terminal 468, to ground at the back contact of relay 700. Relay 444 also closes a circuit from battery through the winding of sequence switch magnet 400, upper right contact of cam 423, middle and inner left front contacts of relay 444, brush 462, terminal 468, to ground at the outer left contact of relay 700 advancing sequence switch 400 to position 6 in which position relay 444 is held operated in the above traced locking circuit. Relay 444 in operating extends the registration circuits from the sender to the operator's position so that the sender may be positioned.

When sequence switch 400 reaches position 6, a circuit is closed from ground over the upper right contact of cam 448, through resistance 449, brush 461, terminal 467, winding of relay 701, to battery. Relay 701 operates disconnecting battery from terminal 469, maintaining the sender busy. It also connects ground over its right front contact, outer right back contact of relay 703, back contact of relay 1000, winding of relay 1001 to battery. Relay 1001 operates in this circuit. With relays 1001 and 701 operated a circuit is completed from ground at the right front contact of relay 701, left back contact of relay 703, conductor 704, right front contact of relay 1001, winding of relay 1002 to battery. Relay 1001 also extends ground from conductor 704 over its inner right front contact, right back contact of relay 1003, to the winding of relay 1004 and battery, which relay operates and locks from battery through its winding, right winding of relay 1003, inner right contact of relay 1004, right front contact of relay 1002 to grounded conductor 704. Relay 1003 cannot operate at this time being shunted by the operating circuit of relay 1004. Relays 1001 and 1004 are ineffective at this time.

The operation of relay 701 also closes a circuit from ground over its right front contact, right back contact of relay 703, conductor 708, outer right back contact of relay 705, windings of relays 706 and 707 to battery. Relays 706 and 707 operate in this circuit, relay 706 locking over its inner contact, outer right back contact of relay 709, to grounded conductor 708. With relay 706 operated, ground from conductor 708 is extended over the right back contact of relay 709, outer left contact of relay 706, windings of relays 710 and 711 to battery. Relays 710 and 711 operate, relay 710 locking over its inner left contact to conductor 708. With relay 710 operated the ground from the back contact of relay 709 is extended over the outer left contact of relay 710, windings of relays 712 and 713 to battery and these relays operate, relay 712 locking to conductor 708. With relay 712 operated a circuit is closed from battery through resistance 714, winding of relay 715, outer left contact of relay 706, back contact of relay 709, to grounded conductor 708. Relay 715 extends the grounded conductor 708 over its outer right contact, through the winding of relay 705 to battery over the right back contact of relay 716. Relay 705 locks to conductor 708 and opens the energizing circuit of relay 706, but that relay together with relays 710 and 712 are locked to conductor 708 in turn holding their companion relays 707, 711 and 713.

Relay 705 prepares a circuit for relay 716, and completes a circuit to inform the B operator that the sender is ready to be set. This circuit may be traced from grounded conductor 704, left back contact of relay 1005, conductor 1006, right winding of relay 1105, conductor 1106, outer right front contacts of relays 707, 711 and 713, left winding of relay 717, middle left contact of relay 705, outer right back contact of relay 700, conductor 730, terminal 472, brush 466, outer right front contact of relay 444, brush 502, right back contact and winding of relay 614, left back contact of relay 613, contacts of key 625, conductor 640, outer left front contact of relay 610 to battery at the left front contact of relay 604. The sender relays do not operate in this circuit but relay 614 operates and locks over its inner right contact to ground, and opens the circuit of lamp 612 indicating to the B operator that the sender has been attached and the number may be recorded. Relay 614 in operating also removes the shunt normally closed around the winding of relay 611, over the inner left back contact of relay 611, and the outer right back contact of relay 614 to ground, permitting that relay to operate. With relays 614 and 611 operated three registration circuits are established. These circuits may be traced through the link circuit as follows: One circuit which will be identified hereinafter as circuit No. 1 may be traced from brush 504, inner middle right contact of relay 424, outer left middle right contact of relay 444, brush 464, terminal 470, to conductor 718 of the sender. A second circuit which will be identified as circuit No. 2 may be traced from brush 501, inner right front contact of relay 444, brush 465, terminal 471, to conductor 721 in the sender. The third circuit which will be identified as circuit No. 3 may be traced from brush 502, outer right front contact of relay 444, brush 466, terminal 472 to conductor 730 in the sender.

At the position, circuit No. 1 is extended over the left front contact of relay 611 through low resistance 627, to conductor 626 and the passive contacts of keys No. 1 and No. 6 and key 625 and through low resistance 627 and high resistance 632 in series to conductor 633 and the passive contacts of keys No. 2 and No. 7. Circuit No. 2 is extended over the right contact of relay 611, through low resistance 631 to conductor 638 and the passive contacts of keys No. 3 and No. 8 and key 625, and through low resistance 631 and high resistance 634 in series to conductor 650 and the passive contacts of keys No. 4 and No. 9. Circuit No. 3 is extended through the right winding of relay 630, left front contact of relay 614, low resistance 629 to conductor 628 and passive contacts of keys Nos. 0 to 4, and through low resistance 629 and high resistance 636, conductor 637 to passive contacts of keys Nos. 5 to 9. Battery is connected over the left front contact of relay 604, outer left front contact of relay 610 to conductor 640, through the normal contacts of key 625 to the active contacts of all of the keys. From a consideration of the above it will be apparent that circuit No. 3 is completed whenever a key is depressed and that either circuit No. 1 or circuit No. 2 or neither will be completed by the operation of any numerical key but not both while the operation of key 625 completes both circuit No. 1 and circuit No. 2 but not circuit No. 3.

At the sender, circuit No. 1 extends at this time over the inner left back contact of relay 709, winding of relay 719, right winding of relay 717, outer left front contacts of relays 713, 711, and 707, conductor 723, left windings of relays 1104 and 1103, conductor 1107, left contact of relay 1003 to grounded conductor 704. Circuit No. 2 extends from conductor 721 over the outer left back contact of relay 709, winding of relay 722, right winding of relay 717, and thence as traced for circuit No. 1 to grounded conductor 704. Circuit No. 3 extends from conductor 730, over the right back contact of relay 700, middle left front contact of relay 705, left winding of relay 717, outer right front contacts of relays 713, 711 and 707, conductor 1106, right winding of relay 1105, conductor 1006, left back contact of relay 1005, to grounded conductor 704.

Should the operator press a key before the sender has been connected with the position and the registration circuits above traced are ready, a circuit is closed from ground through the right winding of relay 613, left back contact of relay 614, through either low resistance 629 or both resistances 629 and 636 to battery through the depressed key. Relay 613 operates and locks over its left front contact, contact of key 625, to battery over conductor 640. This transfers the circuit of lamp 612 from direct ground at the outer right back contact of realy 614 to ground through interrupter 624, thus warning the operator that she has started to set up the number prematurely. By operating key 625 she may release any falsely operated relays of the sender and also restore the circuit of the lamp. When the sender is ready lamp 612 will be extinguished and she may proceed to set up the number.

Assuming for the purpose of illustration that the called line number is 3456, the B operator will successively operate keys Nos. 3, 4, 5 and 6. From the circuits above traced for the completion of the three registration circuits, it will be seen that the operation of key No. 3 extends circuits No. 2 and No. 3 to battery through low resistance. The completion of circuit No. 3 operates relay 630 which locks over its left front contact, outer left front contact of relay 602, to ground at the outer right front contact of relay 604. Relay 630 in operating extends the circuit of meter 651 to the locking ground of relay 630. Since circuit No. 3 is completed no matter which key is operated, and relay 630 locks as soon as operated, it will be apparent that the first depression of a key by an operator in the completion of a call will register once on the peg count meter 651.

At the sender, since circuit No. 2 was completed, relays 722, 717 and 1103 will be operated and since it was completed through the low resistance only, relay 1104 will also be operated. The operation of relay 1103 closes an obvious circuit for relay 1102. The operation of relay 722, closes a circuit from ground at its front contact over the inner right back contact of relay 703, inner right front contact of relay 713, inner left front contacts of relays 711 and 707, winding of relay 1101 to battery. Relay 1101 locks through resistance 1108, conductor 1107, left back contact of relay 1003 to grounded conductor 704. Relay 1103 locks in a circuit from battery through its right winding and right front contact to grounded conductor 1107. Relay 1104 locks through its right winding and right contact to grounded conductor 1006. The completion of circuit No. 3 through low resistance 629 alone causes the operation of relay 1105 which locks through its left winding and left front contact to grounded conductor 1006. The operation of relay 717 closes a circuit from grounded conductor 708, front contact of relay 717, inner left front contact of relay 713, inner right front contacts of relays 711 and 707 to the winding of relay 707. Relay 707 is held operated but relay 706 is shunted by the connection of ground to both sides of its winding and releases. When key No. 3 is released, relay 717 releases in turn releasing relay 707. The release of relay 707 transfers the registration circuits to the relays of register 1110, corresponding to those of register 1100 traced above.

The depression of key No. 4 extends circuit No. 2 to battery through high resistance 634 in addition to resistance 631, and extends circuit No. 3 to battery through low resistance 629. Therefore relays 722, 717 and 1113 are operated in circuit No. 2 and relays 717 and 1115 in circuit No. 3, while the operation of relay 722 closes a circuit for relay 1111. Relays 1111 and 1113 lock to grounded conductor 704 over the back contact of relay 1008, while relay 1115 locks over conductor 1006. The operation of relay 717 extends a circuit from grounded conductor 708, front contact of relay 717, inner left front contact of relay 713, inner right front contact of relay 711, inner right back contact of relay 707, to the winding of relay 711, shunting relay 710 which releases opening the locking circuit of relays 710 and 711. When key No. 4 is released, relay 711 also releases extending circuits Nos. 1, 2 and 3 to the relays of register 1120.

The operation of key No. 5 completes circuit No. 3 through both high and low resistance to battery. Therefore relay 717 alone is operated, none of the relays of register 1120 being operated. The operation of relay 717 connects ground over the inner left front contact of relay 713, inner right back contact of relay 711 to the winding of relay 713 shunting and releasing relay 712. When key No. 5 is released, relay 713 also releases extending circuits Nos. 1, 2 and 3 to the relays of register 1130.

The depression of key No. 6 completes circuit No. 3 through high and low resistance to battery and circuit No. 1 through low resistance only. Relays 719, 717, 1133 and 1134 are operated in circuit No. 1, but relay 1135 is not operated due to the high resistance in circuit No. 3. The operation of relay 717 connects ground from conductor 708 over the inner left back contact of relay 713, to resistance 714 and battery, shunting relay 715 and releasing that relay.

If the B operator depresses a wrong key and realizes it before she has pressed the last key corresponding to a particular number, she may release the sender by operating key 625. By so doing, she connects battery over conductor 626 and low resistance 627 to circuit No. 1 and over conductor 638 and low resistance 631 to circuit No. 2. Therefore, relays 722 and 719 are operated at the same time in the sender, which does not occur when she operates any of the numerical keys. The simultaneous operation of relays 722 and 719 closes a circuit from ground over the front contacts of these relays to the winding of relay 703 and battery. Relay 703 in operating extends the circuit of these relays through resistance 720 to ground at the front contact of relay 701, and disconnects ground from conductors 704 and 708 with the result that the transfer relays and the register relays which have been previously operated are released and the sender made ready for a correct setting. Since these operations do not affect the link circuit relay 701 remains operated and the sender remains attached to the link. The operation of key 625 opens the circuit of relay 614 and that relay releases restoring the circuit of the white lamp 612. When the transfer relays of the sender have been reoperated, following the release of key 625, and the sender is ready to receive the setting, relay 614 is again operated and lamp 612 is extinguished to inform the B operator to that effect.

When the last key is released and relay 717 falls back, a circuit is closed from battery, winding of relay 709, back contact of relay 715, inner left front contact of relay 705, back contact of relay 717, to grounded conductor 708. Relay 709 operates and locks directly to conductor 708. Relay 709 closes a circuit from battery through the winding of relay 700, outer front contact of relay 709 to grounded conductor 708. The operation of relay 700 disconnects ground from terminal 468, releasing relay 444. The release of relay 444 closes a circuit extending from ground at the repeating coil of the A operator's cord circuit, over the left contacts of cam 338, terminal 459, brush 479, uppermost back contact of relay 415, upper left and lower right contacts of cam 480, inner right back contact of relay 444, brush 465, terminal 471, outer left front contact of relay 709, winding of relay 716, outer left front contact of relay 705 to battery. This circuit acts as a test of the continuity of the connection between the sender and the incoming selector. Relay 716 operates in this circuit locking to battery over its front contact and removing battery from the winding of relay 705, releasing relay 705. With relay 705 released, a circuit is closed from battery through the winding of relay 402, right contacts of cam 401, front contact of relay 425, outer right back contact of relay 444, brush 466, terminal 472, conductor 730, right front contact of relay 700, left back contact of relay 1014, inner right back contact of relay 705, to grounded conductor 708. Relay 402 operates in this circuit and locks over its inner right front contact, upper left and lower right contacts of cam 422, outer right back contact of relay 444, and thence as traced to grounded conductor 708.

Relay 402 advances sequence switch 400 into position 7 in a circuit which may be traced from battery through the winding of sequence switch magnet 400, left contacts of cam 408, conductor 407, outer right front contact of relay 402 to ground. The advance of sequence switch 400 from position 6 opens the locking circuit of relay 437 and that relay releases disconnecting the position from the trunk and opening the circuit of relay 610. The release of relay 610 removes battery from the lamps 612 and 622 and from conductor 640, releasing relays 602 and 614 and in turn relays 616, 630 and 611. Thereupon the B operator's position may be selected to control the extension of another call.

The advance of sequence switch 400 from position 6 also opens the circuit of relays 425 and 306 and these relays release. The release of relay 306 closes a circuit from battery through the winding of sequence switch magnet 300, upper left contact of cam 313, inner left back contact of relay 306 to ground over the lower contacts of cam 307 advancing sequence switch 300 to position 1. The advance of sequence switch 300 from position 18 opens the circuit of relay 716 and that relay releases to establish the fundamental relay circuit in the sender. With sequence switch 300 in position 1 and sequence switch 400 in position 7, the fundamental circuit may be traced from battery through the winding of relay 316, upper right and lower left contacts of cam 317, terminal 481, brush 482, upper right and lower left contacts of cam 483, inner right back contact of relay 424, left back contact of relay 444, brush 464, terminal 470, conductor 718, inner left front contact of relay 709, front contact of relay 1002, back contact of relay 1015, left winding of relay 1016, winding of stepping relay 1017, left back contact of relay 716, outer left front contact of relay 709, conductor 721, terminal 471, brush 465, inner right back contact of relay 444, lower right and upper left contacts of cam 480, uppermost back contact of relay 415, brush 479, terminal 459, resistance 315, lower contacts of cam 314, to ground. Relay 316 operates in this circuit in turn operating relay 306, through its right winding, lower contacts of cam 347, left front contact of relay 316, lower contacts of cam 318 to ground. Relay 306 locks in a circuit through its right winding and right front contact, upper right and lower left contacts of cam 347, left front contact of relay 316, to ground over the lower contacts of cam 318. Relay 306 in operating advances sequence switch 300 to position 2 in a circuit which extends through the winding of magnet 300, lower left contact of cam 313, left front contact of relay 306 to ground over the lower contacts of cam 307. The energizing circuit of relay 306 is open in position 2 but that relay remains operated in the locking circuit above traced. With sequence switch 300 in position 2 a circuit is prepared which may be traced from ground over the upper left contact of cam 331, brush 321, commutator strip 320, right contacts of cam 319, to the winding of relay 316. Relay 306 in position 2 closes a circuit from battery through winding of updrive magnet 322, left contacts of cam 323, inner left front contact of relay 306 to ground over the lower contacts of cam 307. The incoming selector is moved upward under the control of magnet 322 and the circuit above traced over commutator strip 320 is intermittently closed, holding relay 316 operated and shunting the stepping relay of the sender.

When the fundamental circuit above traced was completed, relay 1017 operated closing a circuit from ground over its contact, inner left front contact of relay 1004, outer left front contact of relay 1105, left front contact of relay 1104, right front contact of relay 1102, inner left front contact relay 1101, back contact of the No. 1' counting relay, winding of the No. 1 counting relay to battery. The No. 1 counting relay operates and locks in a circuit through the winding of the No 1' counting relay to ground at the outer right front contact of relay 1004, but the No. 1' counting relay cannot operate being shunted by the energizing circuit of the No. 1 counting relay. When the intermittent circuit above described is first closed, relay 1017 releases permitting the No. 1' counting relay to operate. The operation of the No. 1' relay extends the circuit controlled by relay 1017 over its front contact, outer right back contacts of relays 1011 and 1013 to the winding of the No. 0 counting relay. The No. 0 counting relay locks through the windings of relays 1015 and 1000 in parallel to ground at the left front contact of relay 1004. When the intermittent circuit is closed a second time, these relays operate. Relay 1015 opens the fundamental circuit releasing relay 316 as soon as the intermittent circuit above traced is also open. The release of relay 316 releases relay 306 and advances sequence switch 300 to position 3 in a circuit which may be traced through the winding of magnet 300, upper left contact of cam 313, inner left back contact of relay 306 to ground over the lower contacts of cam 307.

The operation of relay 1000 opens the circuit of relay 1001 but relay 1001 is slow to release and a temporary holding circuit is completed for that relay over the front contact of relay 1000, left front contact of relay 1001, front contact of relay 1015, to the fundamental circuit, which remains completed as long as the shunting circuit over the commutator strip 320 exists. As soon as the shunting circuit is opened no further circuit exists for relay 1001 and it releases after an interval. The purpose of this arrangement is to synchronize the operation of the sender with that of the selector, and prevent the closure of the circuits for the next selection before the selector is ready.

When relay 1001 finally opens its contacts, relay 1003 operates in the locking circuit of relay 1004 and in turn locks through its left winding to conductor 704. The operation of relay 1003 opens the locking circuit of the register relays 1101 and 1103 and prepares a circuit for relay 1007, over the right back contact of relay 1005 and the right front contact of relay 1003 from the inner right front contact of relay 1001. The release of relay 1001 in turn releases relay 1002 which is also slow to release and which opens the circuit of relay 1004 after relay 1003 has had time to lock. The release of relay 1004 opens the locking circuit for the counting relays and thus permits relay 1015 to reclose the fundamental circuit at its contact. The release of relay 1000 recloses the circuit of relay 1001 which in turn closes the circuit for relay 1002 and completes the circuit above traced for relay 1007. Relay 1007 locks through the right winding of relay 1005 and the inner right contact of relay 1007, right front contact of relay 1002 to grounded conductor 704, but relay 1005 cannot operate, being shunted by the operating circuit of relay 1007.

With relay 1002 operated and relay 1015 released, the fundamental circuit is again established, and relay 316 reoperates. Relay 316 again operates relay 306 and relay 306 locks as before and advances sequence switch 300 to position 4 in the same circuit used for advancing it to position 2. With sequence switch 300 in position 4, an intermittent circuit is closed from ground over the lower contacts of cam 307, left front contact of relay 306, lower contacts of cam 323, brush 325, commutator strip 324, lower contacts of cam 326, to the winding of relay 316. The circuit of updrive magnet 322 is closed as previously traced. In positions 3 and 4 of sequence switch 300 trip magnet 350 is operated over the lower right contact of cam 331, so that on the next upward movement of the incoming selector the selected set of brushes is tripped.

At this time the operation of relay 1017 closes a circuit from ground over its front contact, inner right front contact of relay 1007, right front contact of relay 1104, inner right front contact of relay 1105, left front contact of relay 1115, back contact of the No. 2' counting relay, winding of the No. 2 counting relay to battery. After the intermittent circuit above traced has been completed three times, thus selecting the third group of outgoing trunks, relays 1015 and 1000 operate in the manner above described, releasing relay 316 and opening the locking circuit of relay 306. Relay 306 is held operated until the brushes are centered on the first set of terminals of the group in a circuit which may be traced from ground, over the lower contacts of cam 307, left front contact of cam 306, lower contacts of cam 323, brush 330, commutator strip 329, lower contacts of cam 346, right winding of relay 306 to battery. After the commutator brush 325 has engaged an insulating segment, relays 1001 and 1002 release as previously described, causing the operation and locking of relay 1005 and the release of relay 1007. Upon the reoperation of relays 1001 and 1002 in the manner previously described a circuit is established for relay 1009 which locks through the right winding of relay 1008 without however operating relay 1008. The release of relay 306 advances sequence switch 300 to position 5.

In position 5 a circuit is closed from battery through resistance 332, left winding of relay 306, lower right contact of cam 304 to ground. Relay 306 operates closing a holding circuit for itself over its right front contact, left contacts of cam 319, to sleeve brush 327. Relay 306 advances sequence switch 300 to position 6. If the final selector, on the sleeve terminal of which brush 327 is resting, is busy, ground will be connected to that terminal and relay 306 will be held operated to in turn operate the updrive magnet 322 and advance the incoming selector in a trunk hunting movement. When an idle selector is found, ground will be absent from its sleeve terminal and relay 306 will release stopping the selector and advancing sequence switch 300 through position 7 to position 8. Relay 306 is held operated until the brushes are properly centered by a circuit from battery through resistance 332, left winding of relay 306, upper left and lower right contacts of cam 346, centering commutator 329, brush 330, lower contacts of cam 323, left front contact of relay 306, to ground over the lower contacts of cam 307. The release of relay 306 immediately connects ground over the upper right contact of cam 331, right back contact of relay 306, left contacts of cam 319 to the sleeve brush 327 to mark the final selector busy. As soon as sequence switch 300 reaches position 6¾ ground is connected directly to brush 327, over the upper contact of cam 304, maintaining the final selector busy until the incoming selector leaves the talking position following its release.

In position 8 the control circuits are extended to the final selector which has not been shown since it may be of any standard type, for example, that shown in U. S. Patent No. 1,658,829, granted February 14, 1928, to C. H. Berry. The fundamental circuit for final selection is the same as for incoming selections. Relay 316 operates in the fundamental circuit and closes a circuit for relay 306 from battery through its right winding, lower contacts of cam 347, left front contact of relay 316, lower left and upper right contacts of cam 318 to the tip conductor. A parallel circuit through resistance 332 and the upper left contact of cam 347, prevents relay 306 from operating until direct ground is connected to the tip conductor following final selections. The final selector in making selections connects an intermittent ground to the ring conductor which is extended over the upper right and lower left contacts of cam 326 to the winding of relay 316, holding that relay operated and shunting the stepping relay of the sender in the same manner as the commutator of the incoming selector.

When relay 316 operates in positions 8 it closes a circuit from battery through resistance 336, winding and left normal contact of relay 333, left front contact of relay 316, to ground over the right contacts of cam 314. Relay 333 locks over its left alternate contact to ground over cam 314. A circuit also exists for relay 334, extending from battery, resistance 337, through the winding of relay 334 to ground over the normal or alternate contact of relay 333. However, relay 334 is shunted by a circuit extending from resistance 337, over the left back contact of relay 334 to the front contact of relay 316. When the fundamental circuit is opened following final brush selection, relay 316 releases and opens this shunt permitting relay 334 to operate in parallel with relay 333. When relay 316 reoperates to control final tens selection, it connects ground over the left front contact of relay 334, to resistance 336 in shunt of the winding of relay 333 and that relay releases. Relay 334 is held operated over the normal contact of relay 333 and a circuit is also closed from battery through the winding of relay 335, outer right front contact of relay 334, right back contact of relay 333, to ground on cam 314. Relay 335 locks directly to this ground. When relay 316 releases following the tens selection, relay 334 also releases. When relay 316 operates for final units selection, it reoperates relay 333 and when it releases following units selection, relay 334 also reoperates. With relays 333 to 335 operated, ground is connected from cam 314 over the right front contact of relay 333, left front contact of relay 335, inner right front contact of relay 334, back contact of relay 316, lower right and upper left contacts of cam 318 to the tip conductor to operate the test relay of the final selector so that it may connect with a busy line without making a test. When the final selector advances, it connects ground to both tip and ring conductors operating relay 316 and relay 306. With relay 306 operated, sequence switch 300 is advanced to position 9.

In the sender, final brush selection is controlled by the setting of register 1110, the circuit under the assumed setting extending from ground at the front contact of relay 1017, inner left front contact of relay 1009, which operates to control final brush selection, right back contact of relay 1114, left front contact of relay 1113, left front contact of relay 1111, back contact of the No. 4' counting relay to the winding of the No. 4 counting relay. Following the completion of final brush selection relays 1001 and 1002 function as before described permitting relay 1008 to energize releasing relay 1009 and operating relay 1011. Final tens selection is controlled by register 1120, the circuit extending from ground over the front contact of relay 1017, inner left front contact of relay 1011, right back contact of relay 1124, left back contact of relay 1123, outer right front contact of relay 1011, right back contact of relay 1125, back contact of the No. 9' counting relay, winding of the No. 9 counting relay to battery. Following five revertive pulses, the circuit is extended over the front contact of the No. 5' counting relay to the winding of the No. 0 counting relay. Following the completion of final tens selection relays 1001 and 1002 function as before described permitting relay 1010 to energize, releasing relay 1011 and operating relay 1013. Final units selection is controlled by register 1130, the circuit extending from ground over the front contact of relay 1017, inner left front contact of relay 1013, right front contact of relay 1134, right front contact of relay 1133, right back contact of relay 1131, back of the No. 1' counting relay, winding of the No. 1 counting relay to battery. After the first revertive pulse, this circuit is extended over the front contact of the No. 1' counting relay, back contact of relay 1011, outer right front contact of relay 1013, right back contact of relay 1135 to the right back contact of the No. 9' counting relay, winding of the No. 9 counting relay to battery.

It is to be noted that the incoming selector is so arranged that one of five brushes is to be selected and one of four groups while the final selector is arranged to select one of five brushes and then one of ten groups and one of ten lines composing the group. Therefore, the only selections which require more than five counting relays are the final tens and final units selections. On that account it is only when these two selections are to be made that the counting relay circuit may be extended to the No. 9 counting relay. Since the relays 1125 and 1135 are operated over circuit No. 3 whenever the digit is less than 5 the condition of these relays determines whether or not the circuit shall be extended to the No. 9 counting relay. Following the completion of final units selection relays 1001 and 1002 again function to permit the operation of relay 1012 and the release of relay 1013.

When sequence switch 300 is advanced to position 9 following the setting of the final selector, relay 316 is connected to the ring conductor of the fundamental circuit, over the left contacts of cam 314, and resistance 315, while ground is connected to the tip conductor of the fundamental circuit over the right contacts of cam 338. Following the control of final units selection, the fundamental circuit is reestablished at the sender in the manner previously described. However, since battery and ground are now reversed in their connection to the fundamental circuit, polarized relay 1016 now operates closing a circuit from battery through the winding of relay 1014, front contact of relay 1016, back contact of relay 1014, right back contact of relay 705 to grounded conductor 708. Relay 1014 locks over its right front contact to grounded conductor 708, and opens the holding circuit provided through the right winding of relay 1016 which prevents the release of relay 1016 until relay 1014 is safely operated. The operation of relay 1014 disconnects ground from terminal 472 thus releasing relay 402. The release of relay 402 advances sequence switch 400 to position 8 in a circuit over the lower left contact of cam 423 to ground at the right back contact of relay 402. With sequence switch 400 in position 8, ground is disconnected from relay 701 at the upper right contact of cam 448 and that relay releases removing ground from conductors 704 and 708, releasing all sender relays and rendering the sender free to be selected by another link. The battery which marks the sender as idle is not connected to terminal 469 until relay 700 closes its inner left back contact following the release of relay 701 thus insuring that the sender relays are released before the sender is marked selectable.

Relay 316 operates in the fundamental circuit in series with relays 1016 and 1017, in turn operating relay 306. Relay 306 advances sequence switch 300 through positions 9, 10 and 11 to position 12. In this position the tip and ring conductors from the A operator's cord are connected through to the final selector and the subscriber's line and she may listen and talk over that line to ascertain what may be wrong therewith.

With link sequence switch 400 in positions 7 and 8 a circuit is closed from battery through the winding of relay 507, right contacts of cam 426, commutator 454, brush 455 to ground. With relay 507 operated, as soon as switch 400 reaches position 8, a circuit is closed from battery through the winding of downdrive magnet 431 which controls the trunk finder, right front contact of relay 507, lower contacts of cam 418 to ground. The trunk finder is restored under the control of magnet 431. When brush 455 reaches normal, the circuit of relay 507 is opened and that relay releases in turn deenergizing the downdrive magnet.

The position finder 500 and the sender finder 460 ordinarily are not moved from the position they occupy. However, if the sender finder is standing on a set of terminals within a predetermined group at the top of its bank, for example the upper ten sets, a circuit is closed from ground over brush 484, commutator segment 485, upper right contact of cam 487, winding of relay 509, resistance 519 to battery. This circuit is closed while the sequence switch is in position 7. Relay 509 locks over the lower contact of cam 487 to ground at its inner right front contact. Therefore when sequence switch 400 reaches position 8 a circuit is closed from battery through the winding of downdrive magnet 435 of the sender finder, outer front contact of relay 509, lower contact of cam 440 to ground, restoring the sender finder to its lowermost position. To insure the release of the downdrive magnet 435 when the sender finder has been restored, a circuit is closed from ground over brush 488 normal commutator segment 489, right contacts of cam 413, to resistance 519 in shunt of the winding of relay 509, releasing relay 509 and stopping the downdrive. When both the trunk finder 410 and the sender finder 460 are restored, a circuit is closed from battery through the winding of sequence switch magnet 400, contact of jack 456, inner right back contact of relay 509, back contact of relay 507, lower contacts of cam 418 to ground. Sequence switch 400 is advanced to position 9 in this circuit.

Sequence switch 400 remains in position 9 until the use of the next preceding link circuit allots this circuit for use. In the arrangement shown the link at the extreme left of Fig. 1 precedes the link shown in full. When that link leaves position 1 and the relay corresponding to relay 402 releases following the finding of the incoming selector a circuit is closed from battery through the winding of relay 402 upper contacts of cam 401, lower contact of cam 403, conductor 404, inner left back contacts of relays 111 and 112, upper contacts of cam 113, inner right back contacts of relays 101 and 111, left contact of cam 450, left contact of cam 114, outer right back contact of relay 101, left contact of cam 115, right contact of cam 116 to ground at the back contact of that relay. Relay 402 operates and closes a circuit from battery through the winding of sequence switch magnet 400, left contacts of cam 408, conductor 407, to ground at the outer right front contact of relay 402 advancing the sequence switch to position 1 in which position relay 402 releases. It will be noted that this circuit will not be closed if any other link circuit is standing in position 1 and extends directly from the link shown to the preceding link, thus responding only to the advance of that link.

The link of Fig. 4 is located on the front of the terminal bank while the links at the left of Fig. 1 are located on the back of the bank. If the motor driving the trunk finders at the back stops, ground is connected to conductor 105, operating relays 107, 111 and 108. If the motor at the front of the panel should stop, ground would be connected to conductor 106 operating the other relays in the motor stop equipment. If the motor at the back stops, the relation of the extreme left link to the link of Fig. 4 is assumed by the link closest the motor stop circuit on the front in their sequential arrangement. Assuming that the link at the right of Fig. 1 is that link, the circuit of relay 402 would extend from battery through the winding of that relay, upper contacts of cam 401, lower contact of cam 403, conductor 404, outer left front contact of relay 111, upper contacts of cam 119, left contact of cam 450, left contact of cam 114 to ground at the inner right front contact of relay 107.

When the A operator has finished her test of the line she removes her plug from the jack releasing relay 302 and in turn releasing relay 303. With relay 303 released, a circuit is closed from battery through the left winding of relay 340, lower right and upper left contacts of cam 310, back contact of relay 303 to ground. Relay 340 connects battery through its right winding and resistance 341 in parallel over the lower left and upper right contacts of cam 344, to the sleeve of the final selector, remaining operated as long as the final selector is off normal. It also closes a circuit from battery through the winding of sequence switch magnet 300, lower left contact of cam 342, left front contact of relay 340 to ground, advancing sequence switch 300 to position 14. The increased battery connected to the sleeve conductor as described initiates the release of the final selector. When the final selector is completely restored ground is removed from the sleeve conductor and relay 340 releases advancing sequence switch 300 to position 15 in a circuit over the back contact of relay 340, upper contact of cam 342, to battery through the winding of magnet 300.

Sequence switch 300 is advanced from position 15 to position 16 in a circuit over the upper right contact of cam 313, to ground at the back contact of relay 303. In position 16 the downdrive magnet 339 is energized over the lower left contact of cam 331. When the incoming selector has been completely restored, a circuit is closed from ground over the upper left contact of cam 331, brush 330, normal segment 343, upper right and lower left contacts of cam 323, lower left contact of cam 313 to battery through the winding of magnet 300 advancing the sequence switch to position 17. As previously stated, this incoming selector remains in position 17 until it is driven out of that position by its selection for use.

*Key monitoring*

In order to monitor upon the operator located at the position shown in Fig. 6, the monitoring operator will first insert her headset plug 901 into jack 902 at the monitoring position supplying ground to the monitoring equipment over conductor 903. She will also insert plug 900 into jack 660 individual to that position at the monitoring position.

If an operator is located at that position, and is idle, this operation closes a circuit from battery, front contact of relay 604, back contact of relay 610, rings of jack 660 and plug 900, contact of key 905, winding of relay 906 to grounded conductor 903. Relay 906 operates locking to battery over its own left front contact. Relay 906 extends ground from conductor 903 to other circuits and also supplies battery for the operation of various relays. The monitoring circuit is therefore ready to observe the work of the B operator. The initiation of a call, as above described, causes the operation of relay 610. Relay 610 completes a circuit from battery over the outer front contact of relay 610, conductor 640, tips of jack 660 and plug 900, inner right back contact of relay 908, winding of relay 907, outer right front contact of relay 906, to grounded conductor 903. Relay 907 in operating closes a holding circuit for itself through the winding of relay 908, over the middle and inner contacts of relay 907, key 905 to battery at the front contact of relay 906, but relay 908 cannot operate being shunted by battery from the position circuit. The operation of relay 907 closes a circuit from battery through the windings of relays 641 and 642 in parallel, sleeves of jack 660 and plug 900, winding of relay 904, left front contact of relay 907, to grounded conductor 903. Relay 904 locks over its right front contact to grounded conductor 903 thus maintaining itself and relays 641 and 642 operated as long as either the monitoring operator's telephone set remains in jack 902 or the plug 900 remains in jack 660. Since these operations can only take place before the tip and ring conductors have been connected through the link and before the B operator's telephone is connected to the link circuit, there will be no clicks to inform the B operator that she is under observation. The operation of relay 641 connects the secondary winding of monitoring operator's repeating coil 930 in parallel with the secondary winding of repeating coil 609 so that the monitoring operator may hear the zip tones and the number given. It also connects lamp 910 in parallel with lamp 622 and lamp 913 in parallel with lamp 612 and prepares a circuit from disconnect key 603. Relay 642 in operating extends conductors 626, 633, 638, 650, 628 and 637 to which battery is connected by the operation of the key set to the monitoring position. The operation of relays 906 and 907 closes a circuit from battery over the left front contact of relay 906, key 905, middle right front contact of relay 907, windings of relays 911 and 912 in parallel, back contact of relay 908, inner right front contact of relay 906 to grounded conductor 903. Relays 911 and 912 complete other points in the monitoring circuits.

With relays 906 and 907 operated the transfer relays of the monitoring position are operated to prepare for the registration of the number. A circuit is closed from grounded conductor 903, inner right front contact of relay 906, inner right back contact of relay 933, outer right front contact of relay 907, conductor 918, back contact of relay 846, windings of relays 841 and 840 in series to battery. Relay 841 locks over its upper front contact to conductor 918 and extends conductor 918 over its lower front contact to the windings of relays 843 and 842. Similarly relay 843 locks to conductor 918 and extends conductor 918 over its lower front contact to the windings of relays 845 and 844. Relay 845 in turn operates relay 847 through resistance 850 and battery, while relay 847 causes the operation of relay 846 from battery connected to conductor 919 over key 905 and the front contact of relay 906.

It will be remembered that the operation of relay 610 closes a circuit for lighting lamp 612, and a flashing circuit for lamp 622. A circuit exists in parallel with lamp 612 extending over conductor 640, next to the inner contact of relay 641, through lamp 913, outer left front contact of relay 911, conductor 931, middle left front contact of relay 907, key 905, to battery at the outer left contact of relay 906. A circuit also extends in parallel with lamp 622 from interrupter 624 over the middle contact of relay 641 through lamp 910, inner left front contact of relay 911 to battery on conductor 931. Therefore lamp 913 is lighted steadily and lamp 910 flashes in synchronism with lamp 622. When the zip tones have been passed and the operator's headset is connected to the trunk, the circuit of lamp 622 is transferred from interrupter 624 to direct ground at the front contact of relay 616. This direct ground also causes lamp 910 to light steadily. When the sender has been connected to the position, the circuit of lamp 612 is extinguished and at the same time lamp 913 is extinguished.

If the operator operates her key set prematurely the flashing circuit for the position lamp 612 will also be effective for flashing monitoring lamp 913 and the operation of key 625 will release any falsely operated relays of the monitoring position.

It will be observed that battery is connected directly to conductor 640 and therefore to each passive contact of the keys. When a key is closed while this position is under observation, it closes not only the circuits to the sender previously traced, but parallel circuits to the monitoring position through resistances which have the same value as the resistances included in the service circuits, so that while the current is divided between two circuits the net resistance is also halved and there is no loss of current from the service circuit.

Assuming that the call just traced is being observed, the depression of key No. 3 will connect battery from conductor 640, over the contact of key 625, right contact of key No. 3, conductor 628, to low resistance 629 for the service circuit, and over the middle lower contact of relay 642, outer left front contact of relay 912, low resistance 926, which is the same in value as resistance 629, left winding of relay 917, which has the same resistance as relay 717, conductor 937, outer lower front contacts of relays 844, 842 and 840 through the upper winding of relay 805 which has the same resistance as relay 1105, conductor 921, inner right back contact of relay 933, inner right front contact of relay 906, to grounded conductor 903. Battery is also connected over left contact of key No. 3, and conductor 638 to low resistance 631 and in parallel over the inner upper contact of relay 642, inner left contact of relay 908, low resistance 915, winding of relay 916 which corresponds to relay 722, right winding of relay 917, conductor 920, uppermost front contacts of relays 844, 842 and 840, lower windings of relays 804 and 803 to grounded conductor 921. The operation of relay 916 closes a circuit from grounded conductor 903, left front contact of relay 916, outer right back contact of relay 933, inner upper front contacts of relays 844, 842 and 840, lower winding of relay 801 to battery so that relays 801, 803, 804 and 805 are operated in the same manner as relays 1101, 1103, 1104 and 1105 are operated. The operation of relay 917 connects ground from conductor 903, inner right front contact of relay 906, inner right back contact of relay 933, front contact of relay 917, inner lower front contacts of relays 844, 842 and 840, to the winding of relay 840, thus shunting the winding of relay 841 and holding relay 840. When relay 917 releases on the release of key No. 3 relay 840 is also released. The release of relay 841 connects ground from conductor 918 over its upper back contact, upper front contacts of relays 804, 803 and 801, conductor 806, through lamp No. 3, conductor 807, outer lower front contact of relay 805 to battery at the lower front contact of relay 846.

Relays 843, 845 and 847 are released in a similar manner by the operation of the other keys, relays 843 and 845 in turn releasing relays 842 and 844. However, relay 846 remains locked to grounded conductor 918. Relays 811, 813, and 815 are operated in parallel with the register relays 1111, 1113, 1115 and relays 833 and 834 in parallel with relays 1133 and 1134. The release of relay 843 closes a circuit from grounded conductor 918, upper back contact of relay 843, upper back contact of relay 814, lower front contacts of relays 813 and 811, conductor 816, lamp No. 4, conductor 817, lower front contact of relay 815 to battery at the front contact of relay 846. The release of relay 845 closes a circuit from grounded conductor 918, upper back contacts of relays 845 and 824, lower back contact of relay 823, conductor 827, lamp No. 5, conductor 828, upper back contact of relay 825, to battery at the contact of relay 846. The release of relay 847 closes a circuit from grounded conductor 918, upper back contact of relay 847, upper front contacts of relays 834 and 833, upper back contact of relay 831, conductor 837, lamp No. 6, conductor 838, upper back contact of relay 835 to battery at the lower front contact of relay 846. Thus each lamp corresponding to the number set up is lighted as soon as the register has been set. If the operator at the B position sets up an incorrect number the fact will be indicated on the lamps.

The disconnection of the position from the link is indicated to the B operator by lamp 622 going out, and to the monitoring operator by the darkening of lamp 910. The release of relay 610 removes battery from conductor 640 opening energizing circuit of relay 907, but relay 907 is held operated in the locking circuit previously traced. Relay 908 now operates in that locking circuit. Relay 908 in operating closes a circuit for lamp 934 over its outer right contact, inner right front contact of relay 906 to grounded conductor 903. The operation of relay 908 opens the circuit of relays 911 and 912 thus disconnecting the monitoring position from the operator's keys so that the setting of these keys for a subsequent call cannot affect the setting already made. This gives the operator time to make any desired record before observing another call. If the call has been set up correctly the monitoring operator will operate key 905 disconnecting battery from relay 846 and from the register relays. It also releases relay 906 to remove ground from the various relays and prepare the monitoring circuit for monitoring another call. As previously indicated relay 906 can only operate while the B operator is idle so that calls will not appear mutilated at the monitoring position.

If the B operator discovers that she has depressed an incorrect key and releases the sender by operating key 625 the operation of that key closes circuits in parallel with those closed to the sender over the uppermost contact of relay 642, outer right front contact of relay 911, low resistance 923, winding of relay 924, right winding of relay 917, to conductor 920 and battery, and over the inner upper front contact of relay 642, left back contact of relay 908, low resistance 915, winding of relay 916, and thence to battery as for the first circuit. Relays 916 and 924 in operating close a circuit from grounded conductor 903, left front contact of relay 916, right front contact of relay 924 to the winding of relay 933 and battery. Relay 933 opens the circuit of register relay 801, 811, 821 or 831 depending on which register is the next to be set; disconnects ground from conductor 921, opening the locking circuit of all the register relays and opens the locking circuits of the transfer relays, thus canceling the operations in Fig. 8. In addition, it closes a circuit from battery which extends through the winding of relays 924 and 916 through the right winding of relay 927, left front contact of relay 933, inner right front contact of relay 906 to ground. Relay 927 locks in a circuit from battery over the left contact of relay 906, key 905, left winding of relay 927 to ground at its own left contact. The operation of relay 927 closes ground at its right contact to lamp 928 to indicate that the sender has been released. When the release key 625 is opened, relays 916 and 924 release in turn releasing relay 933 and the transfer relays are again operated to prepare for receiving the corrected designation. The continued operation of relay 927 does not affect the correct setting of the monitoring registers, but preserves the record that the sender was released.

Start circuit alarms

It will be remembered that the relay 206 was operated in the start circuit at the same time as relay 204. The operation of relay 206 prepares a circuit from battery through the left winding of relay 212, left front contact of relay 206 to ground by way of interrupter 213. When interrupter 213 closes its upper contact this circuit is completed and relay 212 operates locking over its right winding and right front contact to ground at the outer right front contact of relay 206. With relay 212 operated the closure of the lower contact of interrupter 213 completes a circuit over the left contact of relay 212 to the winding of relay 214 and battery. Relay 214 also locks to the outer right front contact of relay 206. Relay 214 in operating connects battery to lamp 215 to indicate that a permanent ground exists on one of the trunks of the B group. It also connects ground to conductor 216 to sound an alarm. In this case the insertion of a plug in jack 201 will release relay 206 and silence the alarm. Since each of the jacks like jack 201 is individual to ten incoming selectors it is possible by inserting the plug in one jack after another to isolate the trouble in a group of ten trunks and therefore to simplify finding it. Under normal operation the finding of the trunk followed by the advance of link sequence switch 400 to position 3 and the operation of relay 306 opens the start lead 308 and releases relay 206 before relay 214 can operate and lock.

The operation of relay 204 prepares a circuit from battery through the left winding of relay 207, inner left front contact of relay 204 to the upper contact of interrupter 213. When the interrupter closes its upper contact relay 207 operates and locks over its right winding and contact to ground at the outer left contact of relay 204. Relay 205 supplies a substitute locking circuit for relay 207 when it operates and releases relay 204. Relay 207 in turn prepares a circuit from battery through the left winding of relay 217 to the lower contact of interrupter 213 and relay 217 locks over the right winding and inner right contact to key 218. Relay 217 closes an obvious circuit for lamp 219 and connects ground to conductor 216 to sound the alarm. Lamp 219 indicates that although a trunk finder has been started the trunk which belonged to the B sub-group has not been found. Had the call originated on a trunk in the bottom panel causing the grounding of conductor 220, relay 206 would have been operated as above and although relay 203 would have been operated in place of relay 204, relay 207 would have been operated in the same manner as described. Similarly if the call originated in the other subgroup of either panel, relays 221 and 222 would have been operated under the control of interrupter 213 to sound an alarm. If the trunk finder is operated and the trunk found in the proper length of time the locking circuit of relay 207 is opened at the contacts of relays 204 and 205 and that relay released before relay 217 can be effective to sound the alarm.

The operation of relay 217 closes a circuit from battery through the left winding of relay 202, outer right front contact of relay 217, outer left front contact of relay 207 to ground. Relay 202 operates and locks over its right winding and inner right contact to ground at the outer left front contact of relay 204. The operation of relay 202 transfers the circuit of conductor 211 over its outer left front contact to the windings of relays 221, 223 and 224 causing relay 224 to operate to summon a link circuit of the A group. Relay 202 is operated if all of the links of its group are busy in a circuit over conductor 225, inner right back contact of relay 112, lower contact of cam 446, contacts of similar cams of the remaining link circuits of the group, cams 102, 103 and 104 to ground. If the motor on either the back or front of the panel stops, ground would be connected to the corresponding conductor 105 or 106 respectively. The grounding of conductor 105, for example, will cause the operation of relays 107, 111 and 108. The operation of these relays in effect cuts off the links whose trunk finder switches are located on the rear of the panel. Relay 107 supplies ground to operate relay 202 when all front trunks are busy in place of cams 103 and 104.

The insertion of a make-busy plug in jack 127 or jack 128 which are individual to groups B and A respectively, operates relay 202 or relay 229 transferring the calls to the other group. If such plugs are inserted in both jacks they are ineffective to operate either relay. If all links become busy so that both relays 202 and 229 are operated, ground is connected over the front contacts of the two relays to sound a special alarm.

Reorder signal

If the link fails to function properly so that sequence switch 400 remains in a given position an undue length of time, means are provided to give the A operator a reorder signal. In certain positions, namely, positions 2, 4, 5 and 7, relay 476 is operated under the control of interrupter 477 locking through its right winding and front contact to the lower left contact of cam 448. The closure of the upper contact of interrupter 477 completes a circuit from ground at the upper left contact of cam 432, contact of interrupter 477, front contact of relay 476 to the right winding of relay 421 and battery. 421 operates and locks through its right winding and the upper left contact of cam 448 to ground. The operation of relay 421 closes a circuit from battery through the lamp 451, middle right contact of relay 421, contact of jack 456, upper left contact of cam 448 to ground. It also connects ground over a second contact of its middle right armature to conductor 490 to sound an alarm. Relay 421 also extends its locking ground to the winding of relay 424, opening the circuit of relay 437 and disconnecting the position from the link. Relay 425 releases on the operation of relay 424. Relay 421 also closes a circuit from battery through the winding of relay 474, outer right contact of relay 421, upper contacts of cam 480, uppermost back contact of relay 415, brush 479, terminal 459 to ground over the lower contacts of the cam 314. Relay 475 is operated by relay 474 in an obvious circuit and locked over its right contact to the upper left contact of cam 448. The operation of relay 474 connects interrupted ground over conductor 491, left front contact of relay 474, back contact of relay 425, inner upper contact of relay 415, brush 427, terminal 428, conductor 429, outer right front contact of relay 303, lower left and upper right contacts of cam 312 to the right winding of relay 306. Sequence switch 300 is advanced to position 12 by the repeated operation and release of relay 306 in response to the interrupted ground. In position 12 the sequence switch is independent of relay 306, but relay 306 intermittently connects ground over the lower contacts of cam 307, inner left front contact of relay 306, resistance 360, lower right and upper left contacts of cam 317, to the ring conductor to intermittently operate the supervisory relay of the A operator's cord circuit to indicate to her that the link is in trouble and that she should select another trunk and extend the call again. The removal of the A operator's plug from the jack of this incoming selector releases the selector and in turn releases relay 474. With relay 474 released and relay 475 operated, a circuit is closed over the back contact of relay 474, front contact of relay 475, contacts of holding jack 492, lower right contact of cam 423, winding of sequence switch magnet 400 to battery advancing the sequence switch to position 8. Sequence switch 400 is advanced to position 9 in the circuit previously described.

In positions 3 and 6, in which positions an idle operator is being sought and registrations are being made, relay 476 is under the control of interrupter 478 which has a slower period than interrupter 477, thus allowing a longer time to elapse before giving the reorder signal to the A operator.

*Abandoned calls*

If the A operator abandons the call, relay 302 is released, in turn releasing relays 303 and 425. If incoming selections have not been started relay 303 closes a circuit from ground over its back contact, upper right contact of cam 313, winding of sequence switch magnet 300 to battery advancing sequence switch 300 to position 4. The sequence switch will be advanced to position 5 over the back contact of relay 306. Relay 306 operates in position 5 advancing sequence switch 300 to position 6. In position 6 relay 306 releases since the sleeve brush is not in engagement with a final selector, advancing the sequence switch 300 to position 8. Sequence switch 300 is advanced to position 9 over the back contact of relay 303, to position 11 over the normal commutator segment 343 and to position 12 over the back contact of relay 303. In position 12 relay 303 operates relay 340 which advances sequence switch 300 to position 14. Since no final selector is engaged relay 340 releases upon the advance of the sequence switch from position 12 and further advances the sequence switch to position 15. Relay 303, released, advances the sequence switch to position 16 and the normal commutator segment advances it to position 17 or normal.

The operation of the link circuit progresses in the normal manner until the sequence switch reaches position 6 in which selections would take place. However, the release of relay 425 immediately advances sequence switch 400 out of position 6 over the upper left contact of cam 423, right back contact of relay 425, to ground at the upper left contact of cam 448. Since relay 402 is not operated, sequence switch 400 is immediately advanced to position 8 over the lower left contact of cam 423 and is then advanced to position 9 in the usual manner.

If selections have been started they are completed and the link released in the normal manner. Since relay 303 is released, sequence switch 300 is advanced out of position 11 over the back contact of relay 303 and relay 340 immediately operates, restoring the final and incoming selectors to normal as above described.

*Holding link*

If there is reason to believe that a particular link has been giving trouble a make-busy plug may be inserted in jack 492. This does not interfere with the normal operation of the link but if, due to faulty operation, relay 421 is operated in turn causing the operation of relays 474 and 475, followed by the release of relay 474, the circuit which is closed over the back contact of relay 474 and the front contact of relay 475 extends over the ring and sleeve of jack 492 and the make-busy plug to the winding of relay 415. The presence of this plug also prevents the closure of a circuit for advancing the sequence switch 400 to position 8, thus holding the sequence switch in the position in which it failed to operate. The operation of relay 415 opens the circuit of the control conductors to prevent interference with any sender or position which may be engaged by the link brushes at the time. With the link out of service it cannot be placed in the preallotted position, which is position 9, and hence, when the next preceding link advances out of position 1 and the relay corresponding to relay 402 releases, which would ordinarily be effective to advance sequence switch 400 to position 1, the circuit extends from ground over the left contact of cam 116, left contact of cam 115, outer right back contact of relay 101, left contact of cam 114, left contact of cam 450, upper contacts of cam 447, lower contact of cam 117, to conductor 118 to operate the relay corresponding to relay 402 in the next link and allot that link.

The insertion of a make-busy plug in jack 456 will silence the alarm, extinguish lamp 451, prevent the operation of relay 476 as long as the link remains in position 8 and prevent the advancing of sequence switch 300 from position 8. If inserted during the progress of a call the operation will not be affected but the link cannot advance beyond position 8. If inserted with the link preallotted or allotted it advances the sequence switch to the out of service position. A dummy plug inserted in this jack will silence the alarm.

*Position disconnect*

If the operator's position is not released from the link as it should be, the operator may disconnect her position by operating key 603. The operation of this key closes a circuit from battery over the left contact of relay 604, left contact of key 603, right winding of relay 610 to brush 505. This increases the current flow through the winding of relay 438 so that that relay is enabled to operate. Relay 438 in turn closes a circuit through the left winding of relay 421 which locks through its right winding and upper left contact of cam 448 to ground. Relay 421 functions as above described to give the A operator a reorder signal.

The operation of disconnect key 603 also closes a circuit from battery over its right contact, lowermost contact of relay 641, inner left front contact of relay 906, outer left back contact of relay 908, winding of relay 935 to grounded conductor 903. Relay 935 locks over its right contact to battery on conductor 919. It also closes at its left contact a circuit for lighting lamp 932 indicating to the monitoring operator that the operator has had to use her disconnect key.

What is claimed is:

1. In a telephone system, an operator's position, a key set thereat, means for extending telephonic connections to said position, means for orally instructing said operator as to wanted telephone designations, means responsive to the setting of said key set in accordance with said designations for controlling the completion of said connections, and means operated during the setting of said key set for indicating the setting of said key set whereby it may be ascertained if said setting is in accordance with said instructions.

2. In a telephone system, an operator's position, a key set thereat, means for extending telephonic connections to said position, means for orally instructing said operator as to wanted telephone designations, means responsive to the setting of said key set in accordance with said designations for controlling the completion of said connections, and means for indicating the setting of said key set whereby it may be ascertained if said setting is in accordance with said instructions, said responsive means and said indicating means being simultaneously operated by the act of operating said key set.

3. In a telephone system, an operator's position, a key set thereat, means for extending telephonic connections to said position. registers for controlling the completion of said connections, other registers, and means simultaneously operated by said key set for operating both said registers.

4. In a telephone system, an operator's position, a key set thereat, means for extending telephonic connections to said position, means for orally instructing said operator as to wanted telephone designations, registers for controlling the completion of said connections, an observing operator's position, indicating means at said observing position, and means simultaneously operated by said key set for operating said registers and said indicating means.

5. In a telephone system, an operator's position, a key set thereat, means for orally instructing said operator as to wanted telephone designations, means responsive to the setting of said key set in accordance with said designations for completing said connections, observing equipment, means for associating said observing equipment with said position, means for rendering said observing equipment responsive to the setting of said key set, and means responsive to the complete setting of said key set to render said observing equipment unresponsive to said position equipment.

6. In a telephone system, an operator's position, means for marking said position as busy or idle, means for marking said position as occupied or vacant, a key set thereat, means for extending telephonic connections to said position, means for orally instructing said operator as to wanted telephone designations, means responsive to the setting of said key set in accordance with said designations for completing said connections, observing equipment, means for associating said observing equipment with said position and means operable only if said position is occupied and idle for rendering said observing equipment responsive to the setting of said key set.

7. In a telephone system, an operator's position, means for marking said position as busy or idle, means for marking said position as occupied or vacant, a key set thereat, means for extending telephonic connections to said position, means for orally instructing said operator as to wanted telephone designations, means responsive to the setting of said key set in accordance with said designations for completing said connections, observing equipment, means for associating said observing equipment with said position, means operable only if said position is occupied and idle for rendering said observing equipment responsive to the setting of said key set, and means responsive to the complete setting of said key set to render said observing equipment unresponsive to said position equipment.

8. In a telephone system, an operator's position, a key set thereat, means for extending telephonic connections to said position, means for orally instructing said operator as to wanted telephone designations, means responsive to the setting of said key set in accordance with said designations for completing said connections, observing equipment having an operator's circuit associated therewith, means for associating said observing equipment with said position, means for rendering said observing equipment responsive to the setting of said key set, means responsive to the complete setting of said key set to render said observing equipment unresponsive to said position equipment, and means controlled by said observing operator to render said observing equipment again responsive to said position equipment.

9. In a telephone system, an operator's position, means for marking said position as busy or idle, means for marking said position as occupied or vacant, a key set thereat, means for extending telephonic connections to said position, means for orally instructing said operator as to wanted telephone designations, means responsive to the setting of said key set in accordance with said designations for completing said connections, observing equipment having an operator's circuit associated therewith, means for associating said observing equipment with said position, means operable only if said position is occupied and idle for rendering said observing equipment responsive to the setting of said key set, means responsive to the complete setting of said key set to render said observing equipment unresponsive to said position equipment, and means controlled by said observing operator to render said observing equipment again responsive to said position equipment.

10. In a telephone system, a key set having battery connected to one side of each key contact, a plurality of registers comprising marginal and sensitive relays, means for setting said registers comprising a plurality of circuits including resistances of different values extending from the other side of said key contacts to said registers, and means for observing the operation of said key set without interfering with the setting of said registers comprising other circuits connected in parallel with said first circuits and each containing the same resistance as the said first circuit with which it is in parallel.

11. In a telephone system, a key set having battery connected to one side of each key contact, a plurality of registers comprising marginal and sensitive relays, means for setting said registers comprising a plurality of circuits including resistances of different values extending from the other side of said key contacts to said registers, means for observing the operation of said key set without interfering with the setting of said registers comprising other circuits connected in parallel with said first circuits and each containing the same resistance as the said first circuit with which it is in parallel, and lamps controlled over said other circuits to indicate which keys have been operated.

12. In a telephone system, an operator's position, a key set thereat, battery connected to one side of each contact of said key set, means for extending telephonic connections to said position, means for orally instructing said operator as to wanted telephone designations, a plurality of registers comprising marginal and sensitive relays, means for setting said registers comprising a plurality of circuits including resistances of different values extending from the other side of said contacts of said key set to said registers, observing equipment, a plurality of other circuits corresponding to said first circuits, each containing the same resistance as the corresponding one of said first circuits, and means for rendering said observing equipment responsive to said key set by connecting each of said other circuits in parallel with the corresponding one of said first circuits.

13. In a telephone system, an operator's position, a key set thereat, battery connected to one side of each contact of said key set, means for extending telephonic connections to said position, means for orally instructing said operator as to wanted telephone designations, a plurality of registers comprising marginal and sensitive relays, means for setting said registers comprising a plurality of circuits including resistances of different values extending from the other side of said contacts of said key set to said registers, observing equipment, a plurality of other circuits corresponding to said first circuits, each containing the same resistance as the corresponding one of said first circuits, means for rendering said observing equipment responsive to said key set by connecting each of said other circuits in parallel with the first circuit containing the same resistance, and means responsive to the complete setting of said key set to disconnect said other circuits from said key set.

14. In a telephone system, an operator's position, means for marking said position as busy or idle, means for marking said position as occupied or vacant, a key set thereat, battery connected to one side of each contact of said key set, means for extending telephonic connections to said position, means for orally instructing said operator as to wanted telephone designations, a plurality of registers comprising marginal and sensitive relays, means for setting said registers comprising a plurality of circuits including resistances of different values extending from the other side of said contacts of said key set to said registers, observing equipment, a plurality of other circuits corresponding to said first circuits, each containing the same resistance as the corresponding one of said first circuits, means operated only if said position is occupied and idle for rendering said observing equipment responsive to said key set by connecting each of said other circuits in parallel with the first circuit containing the same resistance, and means responsive to the complete setting of said key set to disconnect said other circuits from said key set.

15. In a telephone system, an operator's position, a key set thereat, battery connected to one side of each contact of said key set, means for extending telephonic connections to said position, means for orally instructing said operator as to wanted telephone designations, a plurality of registers comprising marginal and sensitive relays, means for setting said registers comprising a plurality of circuits including resistances of different values extending from the other side of said contacts of said key set to said registers, observing equipment having an operator's circuit associated therewith, a plurality of other circuits corresponding to said first circuits, each containing the same resistance as the corresponding one of said first circuits, means for rendering said observing equipment responsive to said key set by connecting each of said other circuits in parallel with the first circuit containing the same resistance, means responsive to the complete setting of said key set to disconnect said other circuits from said key set, and means controlled by said observing operator to release said disconnecting means.

16. In a telephone system, an operator's position, means for marking said position as busy or idle, means for marking said position as occupied or vacant, a key set thereat, battery connected to one side of each contact of said key set, means for extending telephonic connections to said position, means for orally instructing said operator as to wanted telephone designations, a plurality of registers comprising marginal and sensitive relays, means for setting said registers comprising a plurality of circuits including resistances of different values extending from the other side of said contacts of said key set to said registers, observing equipment having an operator's circuit associated therewith, a plurality of other circuits corresponding to said first circuits, each containing the same resistance as the corresponding one of said first circuits, means operated only if said position is occupied and idle for rendering said observing equipment responsive to said key set by connecting each of said other circuits in parallel with the first circuit containing the same resistance, means responsive to the complete setting of said key set to disconnect said other circuits from said key set, and means controlled by said observing operator to release said disconnecting means.

17. In a telephone system, an operator's position, a key set thereat, battery connected to one side of each contact of said key set, means for extending telephonic connection to said position, means for orally instructing said operator as to wanted telephone designations, a plurality of registers comprising marginal and sensitive relays, means for setting said registers comprising a plurality of circuits including resistances of different values extending from the other side of said contacts of said key set to said registers, observing equipment, a plurality of registers in said observing equipment, a plurality of other circuits extending to the registers of said observing equipment corresponding to said first circuits and each containing the same resistance as the corresponding one of said first circuits, means for rendering said observing equipment responsive to said key set by connecting each of said other circuits in parallel with the first circuit containing the same resistance, and means responsive to the complete setting of said key set to disconnect said other circuits from said key set.

18. In a telephone system, an operator's position, a key set thereat, battery connected to one side of each contact of said key set, means for extending telephonic connections to said position, means for orally instructing said operator as to wanted telephone designations, a plurality of registers comprising marginal and sensitive relays, means for setting said registers comprising a plurality of circuits including resistances of different values extending from the other side of said contacts of said key set to said registers, observing equipment having an operator's circuit associated therewith, a plurality of registers in said observing equipment, a plurality of other circuits extending to the registers of said observing equipment corresponding to said first circuits and each containing the same resistance as the corresponding one of said first circuits, means for rendering said observing equipment responsive to said key set by connecting each of said other circuits in parallel with the first circuit containing the same resistance, means responsive to the complete setting of said key set to disconnect said other circuits from said key set, and means controlled by said observing operator to release said disconnecting means.

19. In a registering system, a registering device comprising a plurality of registers, means for setting said registers, a plurality of transfer relays, means responsive to the seizure of said registering device for operating all of said transfer relays and means to successively deenergize said transfer relays to associate said setting means with each of said registers in turn.

20. In a registering system, a registering device comprising a plurality of registers, means for setting said registers, a plurality of transfer relays, means responsive to the seizure of said registering device for operating all of said transfer relays, and means responsive to the repeated operation of said setting means to successively deenergize said transfer relays to associate said setting means with each of said registers in turn.

21. In a registering system, a registering device comprising a plurality of registers, means for setting said registers, a plurality of transfer relays, means responsive to the seizure of said registering device for operating all of said transfer relays, and means responsive to the repeated operation of said setting means to successively deenergize said transfer relays in the order in which they were operated to associate said setting means with each of said registers in turn.

22. In a registering system, a registering device comprising a plurality of registers, means for setting said registers, a plurality of transfer relays for successively associating said setting means with said registers, means responsive to the seizure of said registering device to operate all of said transfer relays, and means responsive to the setting of each register for deenergizing a pair of transfer relays to associate said setting means with the next register.

23. In a registering system, a registering device comprising a plurality of registers, means for setting said registers, a plurality of transfer relays for successively associating said setting means with said registers, means responsive to the seizure of said registering device to successively operate all of said transfer relays in pairs, and means responsive to the setting of each register for deenergizing a pair of said transfer relays in the same order as they were energized to associate said setting means with the next register.

24. In a telephone system, a service operator's position, equipment at said position, equipment for controlling and controlled by said position, a monitoring operator's position, observing equipment at said monitoring position and means for associating said observing equipment with said service position equipment, said means being automatically effective to bring about said association only while said service position is disconnected from said controlling and controlled equipment whereby said association does not disturb the operation of said controlling and controlled equipment and does not apprise the service operator that she is under observation.

25. In a telephone system, a monitoring operator's position, a service operator's position, progress lamps, a head set and register control circuits at each position, equipment for controlling and controlled by said service operator's position, and means for connecting said head sets, said progress lamps and said register control circuits in parallel, said means being automatically effective to make said connections without disturbing the operation of said controlling and controlled equipment and without apprising the service operator that she is under observation.

26. In a telephone system, a monitoring operator's position, a service operator's position, progress lamps, a head set and register control circuits at each position, equipment for controlling and controlled by said service operator's position, and means for connecting said head sets, said progress lamps and said register control circuits in parallel each to each, said means being automatically effective to make said connections before said position is connected with said controlling and controlled equipment whereby said connections do not disturb the operation of said controlling and controlled equipment and do not apprise the service operator that she is under observation.

In witness whereof, I hereunto subscribe my name this 27th day of April, 1928.

JAMES B. NEWSOM.